United States Patent
Coene

(10) Patent No.: US 7,116,250 B2
(45) Date of Patent: Oct. 3, 2006

(54) METHOD AND APPARATUS FOR MULTI-DIMENSIONALLY ENCODING AND DECODING

(75) Inventor: Willem Marie Julia Marcel Coene, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/512,117

(22) PCT Filed: Apr. 1, 2003

(86) PCT No.: PCT/IB03/01255

§ 371 (c)(1),
(2), (4) Date: Oct. 21, 2004

(87) PCT Pub. No.: WO03/092004

PCT Pub. Date: Nov. 6, 2003

(65) Prior Publication Data
US 2005/0171973 A1    Aug. 4, 2005

(30) Foreign Application Priority Data
Apr. 26, 2002  (EP)  .................................. 02076665

(51) Int. Cl.
*H03M 5/06* (2006.01)
(52) U.S. Cl. .......................... 341/68; 341/58
(58) Field of Classification Search ............. 341/55–70
See application file for complete search history.

(56) References Cited

U.S. PATENT DOCUMENTS

| | | | | |
|---|---|---|---|---|
| 6,032,284 A | * | 2/2000 | Bliss ........................... | 341/59 |
| 6,141,783 A | * | 10/2000 | Ashley et al. ................ | 341/68 |
| 6,229,458 B1 | * | 5/2001 | Altekar et al. ................ | 341/59 |
| 6,373,407 B1 | * | 4/2002 | Nishiya et al. ............... | 341/59 |
| 6,807,137 B1 | * | 10/2004 | Chuang ....................... | 341/59 |

OTHER PUBLICATIONS

Adler, R.L., et al., "Algorithms for Sliding Block codes An Application of Symbolic Dynamics to Information Theory", IEEE Trans. Inform. Theory, Vol. 29, 1983, pp. 5-22, no month.

(Continued)

*Primary Examiner*—Lam T. Mai
(74) *Attorney, Agent, or Firm*—Michael E. Belk

(57) ABSTRACT

In a method of multi-dimensionally encoding a user data stream of user words into a channel data stream of channel words evolving in a one-dimensional direction of infinite extent, a user word is encoded into an NRZ channel word by selecting a NRZ channel word from a code table depending on the user word and the current state of an underlying finite-state-machine. A NRZ channel word comprises a sequence of NRZ channel symbols of NRZ channel bits having a one-dimensional interpretation along said one-dimensional direction and wherein states of an underlying finite-state-machine describing the characteristics of the multi-dimensional code are defined by NRZI channel bits of the previous channel work and by NRZ channel symbols of the current channel word. The NRZ channel symbols are transcoded into NRZI channel symbols by a one-dimensional 1T-precoding operation including an intergration modulo 2, said 1T-precoding operation being carried out along said one-dimensional direction of infinite extent. The finite-state-machine is put into a new state selected from the code table depending on said user word and the current state of said finite-state-machine together with encoding a user word into a channel word.

30 Claims, 28 Drawing Sheets

OTHER PUBLICATIONS

Figure 1:
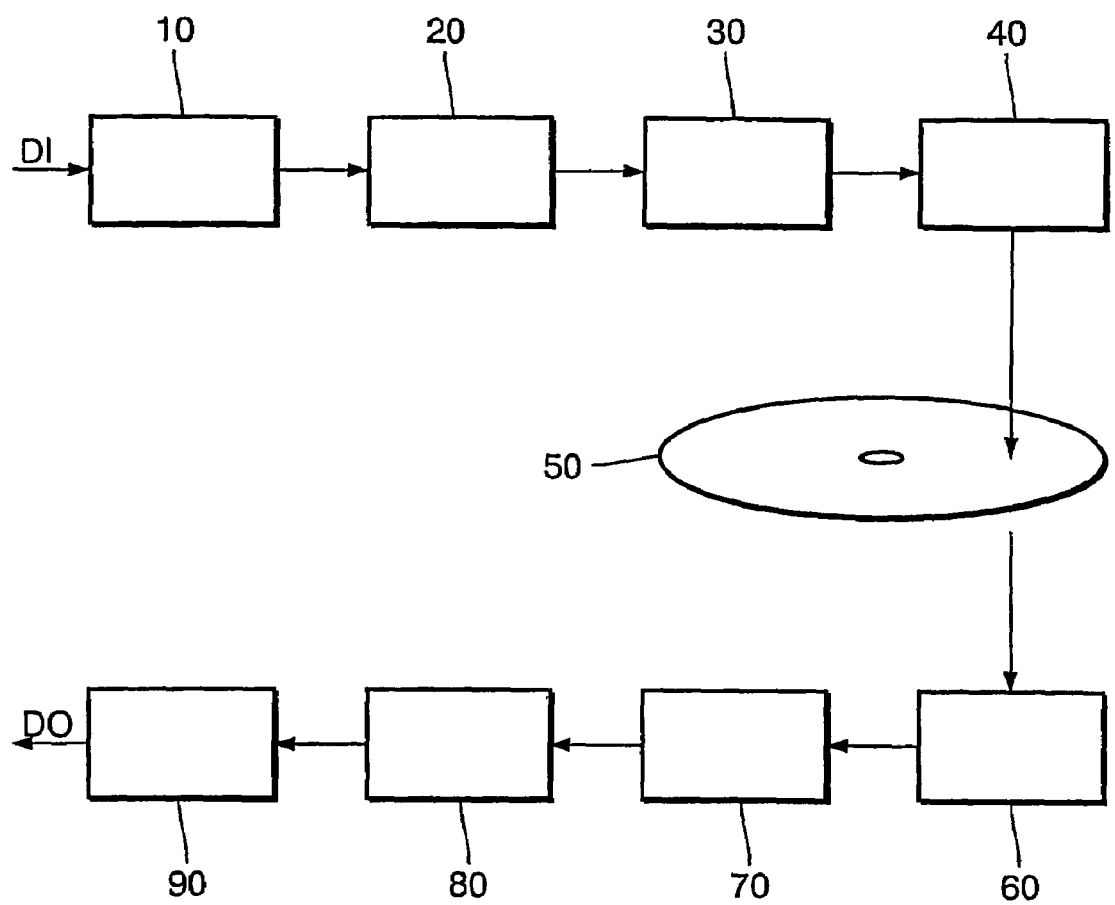

Coene, W., "Combi-Codes for DC-Free Runlength Limited Coding", IEEE Trans. Cons. Electr., vol. 46, pp. 1082-1087, Nov. 2000.

Coene, W., "Multi-dimensional Coding on Quasi-Close-Packet Lattices", EP01203878.2, U.S. Appl. No. 10/492,379, filed Apr. 12, 2004.

* cited by examiner

| Part of Hexagonal Code along a 3-Row Strip |
|:---:|
| $u$  $x$  $a$  $d$  $g$  $j$ |
| /  /  /  /  /  / |
| $v$  $y$  $b$  $e$  $h$  $k$ |
| \  \  \  \  \  \ |
| $w$  $z$  $c$  $f$  $i$  $l$ |

FIG.5A

| One Strip of Fish-Bone Code |
|:---:|
| ⟨⟨⟨⟨⟨⟨⟨⟨ |

FIG.5B

Coherent Stack of Two Strips of Fish-Bone Code, with 3 Rows each

Strip 1:
$x_1 \quad a_1 \quad d_1 \quad g_1 \quad j_1$
$y_1 \quad b_1 \quad e_1 \quad h_1 \quad k_1$
$z_1 \quad c_1 \quad f_1 \quad i_1 \quad l_1$ Strip 2:
$x_2 \quad a_2 \quad d_2 \quad g_2 \quad j_2$
$y_2 \quad b_2 \quad e_2 \quad h_2 \quad k_2$
$z_2 \quad c_2 \quad f_2 \quad i_2 \quad l_2$

FIG.6A

Stack of Two Strips of Fish-Bone Code

<<<<<<<<
<<<<<<<<

FIG.6B

| Isolated Bit in Boundary Row | |
|---|---|
| Isolated and Surrounded Bits | Forbidden Next Triplets |
| $x_S \quad \overline{x_i}$ <br> /    / <br> $x_S$ <br> \    \ <br> .    . | $x_S$ <br> / <br> $x_S$ <br> \ <br> . |

FIG.7A

| Isolated Bit in Central Row | |
|---|---|
| Isolated and Surrounded Bits | Forbidden Next Triplets |
| $x_S \quad x_S$ <br> /    / <br> $x_S \quad \overline{x_i}$ <br> \    \ <br> $x_S \quad x_S$ | . <br> / <br> $x_S$ <br> \ <br> . |

FIG.7B

| STD-State without Isolated Bits | | | |
|---|---|---|---|
| STD-State $\sigma_1$ | STD-State $\sigma_2$ | STD-State $\sigma_3$ | STD-State $\sigma_4$ |
| $x_s$ / $x_s$ \ $x_s$ | $x_s$ / $y_s$ \ $y_s$ | $x_s$ / $y_s$ \ $x_s$ | $x_s$ / $x_s$ \ $y_s$ |

FIG.8

| STD-States with a Single Isolated Bit | | | | |
|---|---|---|---|---|
| (related to $\sigma_2$) | (related to $\sigma_3$) | | | (related to $\sigma_4$) |
| STD-State $\sigma_5$ | STD-State $\sigma_6$ | STD-State $\sigma_7$ | STD-State $\sigma_8$ | STD-State $\sigma_9$ |
| $x_i$ / $y_s$ \ $y_s$ | $x_i$ / $y_s$ \ $x_s$ | $x_s$ / $y_i$ \ $x_s$ | $x_s$ / $y_s$ \ $x_i$ | $x_s$ / $x_s$ \ $y_i$ |

FIG.9

| M = 8-ary NRZ Channel Symbol<br>[I] = (ijk), with I = i + 2j + 4k, 0 ≤ I ≤ 7 |||
|---|---|---|
| Current<br>NRZI Triplet | Channel Symbol<br>[I] | Next<br>NRZI Triplet |
| $x_1$<br>/<br>$y_1$<br>\<br>$z_1$ | →i→<br><br>→j→<br><br>→k→ | $x_2 = x_1(-1)^i$<br>/<br>$y_2 = y_1(-1)^j$<br>\<br>$z_2 = z_1(-1)^k$ |

| M = 8-ary NRZ Channel Symbol Example for l = 6 | | |
|---|---|---|
| Current NRZI Triplets | Channel Symbol [I], l = 6 | Next NRZI Triplet |
| 1 / 0 \ 1 | →0→  →1→  →1→ | 1 / 1 \ 0 |

FIG.12

| Flow of Channel Symbols in STD: Next States | | | | | | | | |
|---|---|---|---|---|---|---|---|---|
| Starting State | Symbol [0] | Symbol [1] | Symbol [2] | Symbol [3] | Symbol [4] | Symbol [5] | Symbol [6] | Symbol [7] |
| $\sigma_1$ | $\sigma_1$ | $\sigma_5$ | $\sigma_7$ | $\sigma_4$ | $\sigma_9$ | $\sigma_{10}$ | $\sigma_2$ | $\sigma_1$ |
| $\sigma_2$ | $\sigma_2$ | $\sigma_1$ | $\sigma_4$ | $\sigma_6$ | $\sigma_8$ | $\sigma_9$ | $\sigma_1$ | $\sigma_5$ |
| $\sigma_3$ | $\sigma_3$ | $\sigma_4$ | $\sigma_1$ | $\sigma_5$ | $\sigma_2$ | $\sigma_1$ | $\sigma_9$ | $\sigma_{10}$ |
| $\sigma_4$ | $\sigma_4$ | $\sigma_6$ | $\sigma_2$ | $\sigma_1$ | $\sigma_1$ | $\sigma_5$ | $\sigma_8$ | $\sigma_9$ |
| $\sigma_5$ | $\sigma_2$ | – | $\sigma_4$ | $\sigma_6$ | $\sigma_8$ | – | $\sigma_1$ | $\sigma_5$ |
| $\sigma_6$ | $\sigma_3$ | – | $\sigma_1$ | $\sigma_5$ | $\sigma_2$ | – | $\sigma_9$ | $\sigma_{10}$ |
| $\sigma_7$ | $\sigma_3$ | $\sigma_4$ | – | – | $\sigma_2$ | $\sigma_1$ | – | – |
| $\sigma_8$ | $\sigma_3$ | $\sigma_4$ | $\sigma_1$ | $\sigma_5$ | – | – | $\sigma_9$ | $\sigma_{10}$ |
| $\sigma_9$ | $\sigma_4$ | $\sigma_6$ | $\sigma_2$ | $\sigma_1$ | – | – | $\sigma_8$ | $\sigma_9$ |
| $\sigma_{10}$ | $\sigma_3$ | – | $\sigma_1$ | $\sigma_5$ | – | – | $\sigma_9$ | $\sigma_{10}$ |

FIG.13

| 2D Code with $N_{nn} = 1$ and $N_{row} = 3$ |||
|---|---|---|
| Code Mapping $m \rightarrow 3n$ | Code Rate $R$ | Efficiency $\eta = \dfrac{R}{C}$ |
| 1 → 3 | 0.333333 | 0.3592 |
| 2 → 3 | 0.666667 | 0.7184 |
| 5 → 6 | 0.833333 | 0.8979 |
| 8 → 9 | 0.888889 | 0.9578 |
| 11 → 12 | 0.916667 | 0.9877 |
| 25 → 27 | 0.925926 | 0.9977 |

FIG.14

| Permutation of Channel Symbols related to Mirror Symmetry ||
|---|---|
| [0] ↔ | [0] |
| [1] ↔ | [4] |
| [2] ↔ | [2] |
| [3] ↔ | [6] |
| [4] ↔ | [1] |
| [5] ↔ | [5] |
| [6] ↔ | [3] |
| [7] ↔ | [7] |

| Permutation of Next States related to Mirror Symmetry ||
|---|---|
| $\sigma_1$ ↔ | $\sigma_1$ |
| $\sigma_2$ ↔ | $\sigma_4$ |
| $\sigma_3$ ↔ | $\sigma_3$ |
| $\sigma_4$ ↔ | $\sigma_2$ |
| $\sigma_5$ ↔ | $\sigma_9$ |
| $\sigma_6$ ↔ | $\sigma_8$ |
| $\sigma_7$ ↔ | $\sigma_7$ |
| $\sigma_8$ ↔ | $\sigma_6$ |
| $\sigma_9$ ↔ | $\sigma_5$ |
| $\sigma_{10}$ ↔ | $\sigma_{10}$ |

FIG.15A            FIG.15B

| FSM-State | 16-State FSM Fish-Bone Main Code with 11-to-12 Mapping ($N_{nn} = 1$ and $N_{row} = 3$) | | Fan-Out |
|---|---|---|---|
| | Related STD-State(s) | Remark, or Limitations on Word abcd | |
| $\Sigma_1$ | $\sigma_1$ (A) | $abc \leq 172$ | 2057 |
| $\Sigma_2$ | $\sigma_1$ (B) | $172 \leq abc \leq 377$ | 2078 |
| $\Sigma_3$ | $\sigma_1$ (C) | $400 \leq abc \leq 617$ | 2054 |
| $\Sigma_4$ | $\sigma_1$ (D) | $abc \geq 620$ | 2119 |
| $\Sigma_5$ | $\sigma_2$ (A), $\sigma_5$ (A) | $\alpha = 0$ or $200 \leq abc \leq 260$ | 2233 |
| $\Sigma_6$ | $\sigma_2$ (B), $\sigma_5$ (B) | $260 \leq abc \leq 477$ | 2137 |
| $\Sigma_7$ | $\sigma_2$ (C), $\sigma_5$ (C) | $\alpha = 6$ or $\alpha = 7$ | 2160 |
| $\Sigma_8$ | $\sigma_2$ (D) | $\alpha = 1$ or $\alpha = 5$ | 2160 |
| $\Sigma_9$ | $\sigma_4$ (A), $\sigma_9$ (A) | via mirroring from $\Sigma_5$ | 2233 |
| $\Sigma_{10}$ | $\sigma_4$ (B), $\sigma_9$ (B) | via mirroring from $\Sigma_6$ | 2137 |
| $\Sigma_{11}$ | $\sigma_4$ (C), $\sigma_9$ (C) | via mirroring from $\Sigma_7$ | 2160 |
| $\Sigma_{12}$ | $\sigma_4$ (D) | via mirroring from $\Sigma_8$ | 2160 |
| $\Sigma_{13}$ | $\sigma_3$ (A), $\sigma_6$ (A), $\sigma_8$ (A), $\sigma_{10}$ (A) | $\alpha = 2$ ($abc \neq 275$, $abc \neq 277$), or $\alpha = 3$ | 2121 |
| $\Sigma_{14}$ | $\sigma_3$ (B), $\sigma_6$ (B), $\sigma_8$ (B) | $\alpha = 1$ or $\alpha = 6$ | 2217 |
| $\Sigma_{15}$ | $\sigma_3$ (C), $\sigma_8$ (C), $\sigma_{10}$ (B) | $\alpha = 0$ or $\alpha = 7$ or $abc = 275$ or $abc = 277$ | 2053 |
| $\Sigma_{16}$ | $\sigma_6$ (C) | via mirroring from $\Sigma_{15}$ | 2053 |

FIG.16

```
*************************************************************
                    11-to-12 Fish-Bone Main Code
*************************************************************
      Σ1/       Σ2/       Σ3/       Σ4/       Σ5/       Σ6/       Σ7/       Σ8/
      Σ9        Σ10       Σ11       Σ12       Σ13       Σ14       Σ15       Σ16
****************************************************************************
user  Channel   Channel   Channel   Channel   Channel   Channel   Channel   Channel
Word  Word      Word      Word      Word      Word      Word      Word      Word
         NS        NS        NS        NS        NS        NS        NS        NS
****************************************************************************
   0  0010  5  1730 13  4001 13  6200  9  0010  1  2600 13  6001  5  1001  5
      0040  1  2300 13  3004  9  4004  9  2001  5  1001 13  0040  5  0040  5
   1  0010  6  1730 14  4001 14  6200 10  0010  2  2600 14  6001  6  1001  6
      0040  2  2300 14  3004 10  4004 10  2001  6  1001 14  0040  6  0040  6
   2  0010  7  1730 15  4001 16  6200 11  0010  3  2600 15  6001  7  1001  7
      0040  3  2300 15  3004 11  4004 11  2001  7  1001 16  0040  7  0040  7
   3  0010  8  1732  1  4002  5  6200 12  0010  4  2601  9  6003  9  1003  9
      0040  4  2304  5  3006  5  4006  5  2003  9  1002  5  0040  8  0040  8
   4  0012  9  1732  2  4002  6  6201 13  0011  4  2601 10  6003 10  1003 10
      0044  9  2304  6  3006  6  4006  6  2003 10  1002  6  0044 13  0044 13
   5  0012 10  1732  3  4002  7  6201 14  0011  6  2601 11  6003 11  1003 11
      0044 10  2304  7  3006  7  4006  7  2003 11  1002  7  0044 14  0044 14
   6  0012 11  1732  4  4002  8  6201 16  0011  7  2601 12  6003 12  1003 12
      0044 11  2304  8  3006  8  4006  8  2003 12  1002  8  0044 15  0044 15
   7  0012 12  1733  5  4003  1  6202  5  0013  9  2602  1  6004  9  1004  9
      0046  5  2302  1  3001  5  4001  5  2004  9  1003  1  0042  9  0042  9
   8  0013 13  1733  6  4003  2  6202  6  0013 10  2602  2  6004 10  1004 10
      0046  6  2302  2  3001  6  4001  6  2004 10  1003  2  0042 10  0042 10
....    ....     ....     ....     ....     ....     ....     ....     ....
2039  1722  8  3760 14  6173 11  7742  6  2456 11  4702  4  7705  9  5704  4
      2153  7  1702  4  7705  5  5701  4  3730 14  6637  5  7770 14  7770 14
2040  1723  1  3760 15  6173 12  7742  7  2457 13  4703  5  7705 10  5705  5
      2157 13  1706  9  7705  6  5705  9  3730 15  6637  6  7770 15  7770 15
2041  1723  2  3761  9  6174  9  7742  8  2457 15  4703  6  7705 11  5705  6
      2157 15  1706 10  7705  7  5705 10  3732  1  6637  7  7772  1  7772  1
2042  1723  3  3761 10  6174 10  7743  1  2460  5  4703  7  7706  1  5705  7
      2130  9  1706 11  7703  1  5705 11  3732  2  6660  9  7772  2  7772  2
2043  1723  4  3761 11  6174 11  7743  2  2460  6  4704  5  7706  2  5706 13
      2130 10  1701  9  7703  2  5703 13  3732  3  6660 10  7772  3  7772  3
2044  1724  1  3761 12  6175 13  7743  3  2460  7  4704  6  7706  3  5706 14
      2130 11  1701 10  7703  3  5703 14  3732  4  6660 11  7772  4  7772  4
2045  1724  2  3762  1  6175 15  7743  4  2460  8  4704  7  7706  4  5706 15
      2130 12  1701 11  7703  4  5703 16  3733  5  6660 12  7776  9  7776  9
2046  1724  3  3762  2  6176  5  7746 13  2461  1  4704  8  7707  5  5707  9
      2134  1  1701 12  7707  9  5707  5  3733  6  6661 13  7776 10  7776 10
2047  1724  4  3762  3  6176  6  7746 14  2461  2  4705  1  7707  6  5707 10
      2134  2  1705  1  7707 10  5707  6  3733  7  6661 14  7776 11  7776 11
****************************************************************************
```

FIG. 17

| Row-Based RDS for a Fish-Bone Code (with bipolar NRZI channel bits $u_j^{(l)}$) |
|---|
| $\cdots \quad u_{i-2}^{(1)} \quad\quad u_{i-1}^{(1)} \quad\quad u_i^{(1)} \rightarrow \text{RDS}_i^{(1)} = \Sigma_{j=-\infty}^{i} u_j^{(1)}$ <br> $\diagup \quad\quad \diagup \quad\quad \diagup$ <br> $\cdots \quad u_{i-2}^{(2)} \quad\quad u_{i-1}^{(2)} \quad\quad u_i^{(2)} \rightarrow \text{RDS}_i^{(2)} = \Sigma_{j=-\infty}^{i} u_j^{(2)}$ <br> $\diagdown \quad\quad \diagdown \quad\quad \diagdown$ <br> $\cdots \quad u_{i-2}^{(3)} \quad\quad u_{i-1}^{(3)} \quad\quad u_i^{(3)} \rightarrow \text{RDS}_i^{(3)} = \Sigma_{j=-\infty}^{i} u_j^{(3)}$ |

FIG.24

| Parity-Vector p for a Channel Word of 3 8-ary Symbols (with NRZ channel bits $a_j^{(l)}$) |
|---|
| $a_1^{(1)} \quad\quad a_2^{(1)} \quad\quad a_3^{(1)} \rightarrow p^{(1)} = \Sigma_{j=1}^{3} a_j^{(1)} \mod 2$ <br> $\diagup \quad\quad \diagup \quad\quad \diagup$ <br> $a_1^{(2)} \quad\quad a_2^{(2)} \quad\quad a_3^{(2)} \rightarrow p^{(2)} = \Sigma_{j=1}^{3} a_j^{(2)} \mod 2$ <br> $\diagdown \quad\quad \diagdown \quad\quad \diagdown$ <br> $a_1^{(3)} \quad\quad a_2^{(3)} \quad\quad a_3^{(3)} \rightarrow p^{(3)} = \Sigma_{j=1}^{3} a_j^{(3)} \mod 2$ |

FIG.25

FIG.26

Overall DC-Control
4 Pairs of Parity-Vectors for $N_{row} = 3$ $\begin{pmatrix} 0 \\ 0 \\ 0 \end{pmatrix}$ ↔ $\begin{pmatrix} 1 \\ 1 \\ 1 \end{pmatrix}$
p = 0, p = 7

$\begin{pmatrix} 1 \\ 0 \\ 0 \end{pmatrix}$ ↔ $\begin{pmatrix} 0 \\ 1 \\ 1 \end{pmatrix}$
p = 1, p = 6

$\begin{pmatrix} 0 \\ 1 \\ 0 \end{pmatrix}$ ↔ $\begin{pmatrix} 1 \\ 0 \\ 1 \end{pmatrix}$
p = 2, p = 5

$\begin{pmatrix} 1 \\ 1 \\ 0 \end{pmatrix}$ ↔ $\begin{pmatrix} 0 \\ 0 \\ 1 \end{pmatrix}$
p = 3, p = 4

FIG.27

Alternation Scheme of Codes $C_1$ and $C_2$ for the Fish-Bone Combi-Code

| ... | $C_1$ | $C_1$ | $C_2$ | $C_1$ | $C_1$ | $C_1$ | $C_2$ | $C_1$ | ... |
|---|---|---|---|---|---|---|---|---|---|
| ... | 11 - 12 | 11 - 12 | 7 - 9 | 11 - 12 | 11 - 12 | 11 - 12 | 7 - 9 | 11 - 12 | ... |

16-State FSM 7 - to - 9 Fish-Bone Substitution Code ($N_{nn} = 1$ and $N_{row} = 3$)

| FSM-State | Related STD-State(s) | Remark, or Limitations on Word abcd | Fan-Out |
|---|---|---|---|
| $\Sigma_1$ | $\sigma_1$ (A) | abc ≤ 177 | 138 |
| $\Sigma_2$ | $\sigma_1$ (B) | 177 ≤ abc ≤ 372 | 130 |
| $\Sigma_3$ | $\sigma_1$ (C) | 372 ≤ abc ≤ 617 | 132 |
| $\Sigma_4$ | $\sigma_1$ (D) | abc ≥ 620 | 132 |
| $\Sigma_5$ | $\sigma_2$ (A), $\sigma_5$ (A) | a = 0 or 200 ≤ abc ≤ 260 | 145 |
| $\Sigma_6$ | $\sigma_2$ (B), $\sigma_5$ (B) | 260 ≤ abc ≤ 477 | 142 |
| $\Sigma_7$ | $\sigma_2$ (C), $\sigma_5$ (C) | a = 6 or a = 7 | 142 |
| $\Sigma_8$ | $\sigma_2$ (D) | a = 1 or a = 5 | 141 |
| $\Sigma_9$ | $\sigma_4$ (A), $\sigma_9$ (A) | via mirroring from $\Sigma_5$ | 145 |
| $\Sigma_{10}$ | $\sigma_4$ (B), $\sigma_9$ (B) | via mirroring from $\Sigma_6$ | 142 |
| $\Sigma_{11}$ | $\sigma_4$ (C), $\sigma_9$ (C) | via mirroring from $\Sigma_7$ | 141 |
| $\Sigma_{12}$ | $\sigma_4$ (D) | via mirroring from $\Sigma_8$ | 142 |
| $\Sigma_{13}$ | $\sigma_3$ (A), $\sigma_6$ (A), $\sigma_8$ (A), $\sigma_{10}$ (A) | a = 2 (abc ≠ 275, abc ≠ 277), or a = 3 | 138 |
| $\Sigma_{14}$ | $\sigma_3$ (B), $\sigma_6$ (B), $\sigma_8$ (B) | a = 1 or a = 6 | 155 |
| $\Sigma_{15}$ | $\sigma_3$ (C), $\sigma_8$ (C), $\sigma_{10}$ (B) | a = 0 or a = 7 or abc = 275 or abc = 277 | 145 |
| $\Sigma_{16}$ | $\sigma_6$ (C) | via mirroring from $\Sigma_{15}$ | 145 |

FIG. 28

```
*************************************************************
              7 - to - 9 Fish-Bone Substitution Code
*************************************************************
```

| Symbol | Parity | | $\Sigma_1$/$\Sigma_9$ Channel Word NS | | $\Sigma_2$/$\Sigma_{10}$ Channel Word NS | | $\Sigma_3$/$\Sigma_{11}$ Channel Word NS | | $\Sigma_4$/$\Sigma_{12}$ Channel Word NS | | $\Sigma_5$/$\Sigma_{13}$ Channel Word NS | | $\Sigma_6$/$\Sigma_{14}$ Channel Word NS | | $\Sigma_7$/$\Sigma_{15}$ Channel Word NS | | $\Sigma_8$/$\Sigma_{16}$ Channel Word NS | |
|---|---|---|---|---|---|---|---|---|---|---|---|---|---|---|---|---|---|---|
| 0 | $\Sigma_1$-$\Sigma_8$ | p_1 | 001 | 5 | 200 | 13 | 373 | 1 | 620 | 9 | 001 | 1 | 260 | 13 | 600 | 1 | 100 | 1 |
| | | p_2 | 006 | 5 | 207 | 13 | 404 | 1 | 627 | 9 | 006 | 1 | 267 | 13 | 607 | 1 | 107 | 1 |
| | $\Sigma_9$-$\Sigma_{16}$ | p_1 | 004 | 1 | 230 | 13 | 300 | 1 | 400 | 1 | 200 | 1 | 100 | 9 | 004 | 5 | 004 | 5 |
| | | p_2 | 003 | 1 | 237 | 13 | 307 | 1 | 407 | 1 | 207 | 1 | 107 | 9 | 003 | 5 | 003 | 5 |
| 1 | $\Sigma_1$-$\Sigma_8$ | p_1 | 001 | 7 | 200 | 15 | 373 | 3 | 620 | 11 | 001 | 3 | 260 | 15 | 600 | 3 | 100 | 3 |
| | | p_2 | 006 | 7 | 207 | 15 | 404 | 3 | 627 | 11 | 006 | 3 | 267 | 15 | 607 | 3 | 107 | 3 |
| | $\Sigma_9$-$\Sigma_{16}$ | p_1 | 004 | 3 | 230 | 15 | 300 | 3 | 400 | 3 | 200 | 3 | 100 | 11 | 004 | 7 | 004 | 7 |
| | | p_2 | 003 | 3 | 237 | 15 | 307 | 3 | 407 | 3 | 207 | 3 | 107 | 11 | 003 | 7 | 003 | 7 |
| 2 | $\Sigma_1$-$\Sigma_8$ | p_1 | 003 | 10 | 201 | 10 | 376 | 13 | 621 | 13 | 002 | 9 | 261 | 10 | 601 | 5 | 101 | 5 |
| | | p_2 | 004 | 10 | 206 | 10 | 401 | 13 | 626 | 13 | 005 | 9 | 266 | 10 | 606 | 5 | 106 | 5 |
| | $\Sigma_9$-$\Sigma_{16}$ | p_1 | 002 | 5 | 234 | 6 | 304 | 9 | 404 | 9 | 201 | 5 | 101 | 13 | 002 | 1 | 002 | 1 |
| | | p_2 | 005 | 5 | 233 | 6 | 303 | 9 | 403 | 9 | 206 | 5 | 106 | 13 | 005 | 1 | 005 | 1 |
| 3 | $\Sigma_1$-$\Sigma_8$ | p_1 | 003 | 12 | 201 | 12 | 376 | 15 | 621 | 16 | 002 | 11 | 261 | 12 | 601 | 7 | 101 | 7 |
| | | p_2 | 040 | 12 | 242 | 12 | 410 | 15 | 651 | 16 | 005 | 11 | 301 | 12 | 606 | 7 | 106 | 7 |
| | $\Sigma_9$-$\Sigma_{16}$ | p_1 | 002 | 7 | 234 | 8 | 304 | 11 | 404 | 11 | 201 | 7 | 101 | 16 | 002 | 3 | 002 | 3 |
| | | p_2 | 005 | 7 | 604 | 8 | 303 | 11 | 403 | 11 | 206 | 7 | 153 | 16 | 005 | 3 | 005 | 3 |
| 4 | $\Sigma_1$-$\Sigma_8$ | p_1 | 003 | 11 | 202 | 2 | 377 | 10 | 622 | 6 | 003 | 13 | 262 | 2 | 603 | 10 | 103 | 10 |
| | | p_2 | 004 | 11 | 205 | 2 | 400 | 10 | 625 | 6 | 004 | 13 | 302 | 2 | 604 | 10 | 104 | 10 |
| | $\Sigma_9$-$\Sigma_{16}$ | p_1 | 006 | 13 | 232 | 2 | 306 | 6 | 406 | 6 | 203 | 10 | 102 | 6 | 006 | 9 | 006 | 9 |
| | | p_2 | 001 | 13 | 602 | 2 | 301 | 6 | 401 | 6 | 204 | 10 | 105 | 6 | 001 | 9 | 001 | 9 |
| ... | ... | ... | ... | ... | ... | ... | ... | ... | ... | ... | ... | ... | ... | ... | ... | ... | ... | ... |
| 124 | $\Sigma_1$-$\Sigma_8$ | p_1 | 056 | 11 | 357 | 6 | 536 | 4 | 756 | 11 | 226 | 1 | 363 | 4 | 737 | 15 | 153 | 6 |
| | | p_2 | 163 | 11 | 350 | 6 | 610 | 4 | 762 | 11 | 230 | 1 | 463 | 4 | 730 | 15 | 572 | 6 |
| | $\Sigma_9$-$\Sigma_{16}$ | p_1 | 242 | 3 | 672 | 2 | 720 | 8 | 542 | 1 | 343 | 5 | 170 | 11 | 762 | 7 | 762 | 7 |
| | | p_2 | 223 | 3 | 172 | 2 | 736 | 8 | 532 | 1 | 377 | 5 | 625 | 11 | 703 | 7 | 703 | 7 |
| 125 | $\Sigma_1$-$\Sigma_8$ | p_1 | 142 | 2 | 360 | 13 | 602 | 9 | 750 | 13 | 205 | 5 | 430 | 6 | 740 | 14 | 147 | 10 |
| | | p_2 | 176 | 2 | 354 | 13 | 425 | 9 | 757 | 13 | 231 | 5 | 462 | 6 | 703 | 14 | 577 | 10 |
| | $\Sigma_9$-$\Sigma_{16}$ | p_1 | 016 | 10 | 672 | 4 | 760 | 14 | 560 | 1 | 346 | 9 | 626 | 1 | 725 | 15 | 725 | 15 |
| | | p_2 | 264 | 10 | 136 | 4 | 710 | 14 | 576 | 1 | 363 | 9 | 630 | 1 | 700 | 15 | 700 | 15 |
| 126 | $\Sigma_1$-$\Sigma_8$ | p_1 | 143 | 5 | 360 | 15 | 602 | 11 | 762 | 10 | 227 | 5 | 432 | 9 | 702 | 10 | 530 | 3 |
| | | p_2 | 177 | 5 | 367 | 15 | 605 | 11 | 765 | 10 | 246 | 5 | 406 | 9 | 741 | 10 | 573 | 3 |
| | $\Sigma_9$-$\Sigma_{16}$ | p_1 | 227 | 10 | 160 | 9 | 721 | 1 | 560 | 4 | 346 | 11 | 626 | 3 | 723 | 12 | 723 | 12 |
| | | p_2 | 213 | 10 | 132 | 9 | 773 | 1 | 576 | 4 | 363 | 11 | 612 | 3 | 760 | 12 | 760 | 12 |
| 127 | $\Sigma_1$-$\Sigma_8$ | p_1 | 146 | 9 | 350 | 8 | 602 | 10 | 763 | 13 | 227 | 7 | 432 | 11 | 740 | 13 | 531 | 5 |
| | | p_2 | 172 | 9 | 346 | 8 | 605 | 10 | 764 | 13 | 257 | 7 | 460 | 11 | 747 | 13 | 536 | 5 |
| | $\Sigma_9$-$\Sigma_{16}$ | p_1 | 260 | 1 | 160 | 11 | 714 | 6 | 564 | 10 | 340 | 13 | 627 | 5 | 166 | 14 | 766 | 14 |
| | | p_2 | 267 | 1 | 176 | 11 | 713 | 6 | 572 | 10 | 347 | 13 | 613 | 5 | 770 | 14 | 770 | 14 |

FIG.29

FIG.30

| Begin Sync $\Sigma_1$ Top-Strip | |
|---|---|
| | NRZ Symbol 0    4 |
| 1 / 1 \ 1 | 1     1 / / 1     1 \ \ 1     0 |

| Begin Sync $\Sigma_2$ Top-Strip | |
|---|---|
| | NRZ Symbol 3    7 |
| 1 / 1 \ 1 | 0     1 / / 0     1 \ \ 1     0 |

| Begin Sync $\Sigma_3$ Top-Strip | |
|---|---|
| | NRZ Symbol 4    7 |
| 1 / 1 \ 1 | 1     0 / / 1     0 \ \ 0     1 |

| Begin Sync $\Sigma_4$ Top-Strip | |
|---|---|
| | NRZ Symbol 7    4 |
| 1 / 1 \ 1 | 0     0 / / 0     0 \ \ 0     1 |

FIG.31A

| Begin Sync $\Sigma_5$ Top-Strip | |
|---|---|
| | NRZ Symbol<br>0      5 |
| 1<br>/<br>0<br>\<br>0 | 1           0<br>/           /<br>0           0<br>\           \<br>0           1 |

| Begin Sync $\Sigma_6$ Top-Strip | |
|---|---|
| | NRZ Symbol<br>3      6 |
| 1<br>/<br>0<br>\<br>0 | 0           0<br>/           /<br>1           0<br>\           \<br>0           1 |

| Begin Sync $\Sigma_7$ Top-Strip | |
|---|---|
| | NRZ Symbol<br>7      5 |
| 1<br>/<br>0<br>\<br>0 | 0           1<br>/           /<br>1           1<br>\           \<br>1           0 |

| Begin Sync $\Sigma_8$ Top-Strip | |
|---|---|
| | NRZ Symbol<br>5      7 |
| 1<br>/<br>0<br>\<br>0 | 0           1<br>/           /<br>0           1<br>\           \<br>1           0 |

| Begin Sync $\Sigma_9$ Top-Strip | |
|---|---|
| | NRZ Symbol<br>0      7 |
| 1<br>/<br>1<br>\<br>0 | 1           0<br>/           /<br>1           0<br>\           \<br>0           1 |

| Begin Sync $\Sigma_{10}$ Top-Strip | |
|---|---|
| | NRZ Symbol<br>6      6 |
| 1<br>/<br>1<br>\<br>0 | 1           1<br>/           /<br>0           1<br>\           \<br>1           0 |

FIG.31B

| Begin Sync $\Sigma_{11}$ Top-Strip | |
|---|---|
| | NRZ Symbol 7  7 |
| 1 / 1 \ 0 | 0   1 /   / 0   1 \   \ 1   0 |

| Begin Sync $\Sigma_{12}$ Top-Strip | |
|---|---|
| | NRZ Symbol 5  5 |
| 1 / 1 \ 0 | 0   1 /   / 1   1 \   \ 1   0 |

| Begin Sync $\Sigma_{13}$ Top-Strip | |
|---|---|
| | NRZ Symbol 3  5 |
| 1 / 0 \ 1 | 0   1 /   / 1   1 \   \ 1   0 |

| Begin Sync $\Sigma_{14}$ Top-Strip | |
|---|---|
| | NRZ Symbol 0  6 |
| 1 / 0 \ 1 | 1   1 /   / 0   1 \   \ 1   0 |

| Begin Sync $\Sigma_{15}$ Top-Strip | |
|---|---|
| | NRZ Symbol 7  6 |
| 1 / 0 \ 1 | 0   0 /   / 1   0 \   \ 0   1 |

| Begin Sync $\Sigma_{16}$ Top-Strip | |
|---|---|
| | NRZ Symbol 7  6 |
| 1 / 0 \ 1 | 0   0 /   / 1   0 \   \ 0   1 |

FIG.31C

| Begin Sync $\Sigma_1$ Bottom-Strip | | | |
|---|---|---|---|
| | NRZ Symbol | | |
| | 0 | 0<br>(7) | 1<br>(5) |
| 1<br>/<br>1<br>\<br>1 | 1<br>/<br>1<br>\<br>1 | 1<br>/<br>1<br>\<br>1 | 0<br>/<br>1<br>\<br>1 |

| Begin Sync $\Sigma_2$ Bottom-Strip | | | |
|---|---|---|---|
| | NRZ Symbol | | |
| | 3 | 0<br>(7) | 5<br>(1) |
| 1<br>/<br>1<br>\<br>1 | 0<br>/<br>0<br>\<br>1 | 0<br>/<br>0<br>\<br>1 | 1<br>/<br>0<br>\<br>0 |

| Begin Sync $\Sigma_3$ Bottom-Strip | | | |
|---|---|---|---|
| | NRZ Symbol | | |
| | 4 | 0<br>(7) | 5<br>(1) |
| 1<br>/<br>1<br>\<br>1 | 1<br>/<br>1<br>\<br>0 | 1<br>/<br>1<br>\<br>0 | 0<br>/<br>1<br>\<br>1 |

| Begin Sync $\Sigma_4$ Bottom-Strip | | | |
|---|---|---|---|
| | NRZ Symbol | | |
| | 7 | 0<br>(7) | 1<br>(5) |
| 1<br>/<br>1<br>\<br>1 | 0<br>/<br>0<br>\<br>0 | 0<br>/<br>0<br>\<br>0 | 1<br>/<br>0<br>\<br>0 |

FIG.32A

| Begin Sync $\Sigma_5$ Bottom-Strip | | | |
|---|---|---|---|
| | NRZ Symbol | | |
| | 0 | 0<br>(7) | 7<br>(3) |
| 1 | 1 | 1 | 0 |
| / | / | / | / |
| 0 | 0 | 0 | 1 |
| \ | \ | \ | \ |
| 0 | 0 | 0 | 1 |

| Begin Sync $\Sigma_6$ Bottom-Strip | | | |
|---|---|---|---|
| | NRZ Symbol | | |
| | 3 | 0<br>(7) | 3<br>(7) |
| 1 | 0 | 0 | 1 |
| / | / | / | / |
| 0 | 1 | 1 | 0 |
| \ | \ | \ | \ |
| 0 | 0 | 0 | 0 |

| Begin Sync $\Sigma_7$ Bottom-Strip | | | |
|---|---|---|---|
| | NRZ Symbol | | |
| | 7 | 0<br>(7) | 7<br>(3) |
| 1 | 0 | 0 | 1 |
| / | / | / | / |
| 0 | 1 | 1 | 0 |
| \ | \ | \ | \ |
| 0 | 1 | 1 | 0 |

| Begin Sync $\Sigma_8$ Bottom-Strip | | | |
|---|---|---|---|
| | NRZ Symbol | | |
| | 5 | 0<br>(7) | 5<br>(1) |
| 1 | 0 | 0 | 1 |
| / | / | / | / |
| 0 | 0 | 0 | 0 |
| \ | \ | \ | \ |
| 0 | 1 | 1 | 0 |

FIG. 32B

| Begin Sync $\Sigma_9$ Bottom-Strip | | | |
|---|---|---|---|
| | NRZ Symbol | | |
| | 0 | 0 (7) | 5 (1) |
| 1 / 1 \ 0 | 1 / 1 \ 0 | 1 / 1 \ 0 | 0 / 1 \ 1 |

| Begin Sync $\Sigma_{10}$ Bottom-Strip | | | |
|---|---|---|---|
| | NRZ Symbol | | |
| | 6 | 0 (7) | 3 (7) |
| 1 / 1 \ 0 | 1 / 0 \ 1 | 1 / 0 \ 1 | 0 / 1 \ 1 |

| Begin Sync $\Sigma_{11}$ Bottom-Strip | | | |
|---|---|---|---|
| | NRZ Symbol | | |
| | 7 | 0 (7) | 5 (1) |
| 1 / 1 \ 0 | 0 / 0 \ 1 | 0 / 0 \ 1 | 1 / 0 \ 0 |

| Begin Sync $\Sigma_{12}$ Bottom-Strip | | | |
|---|---|---|---|
| | NRZ Symbol | | |
| | 5 | 0 (7) | 7 (3) |
| 1 / 1 \ 0 | 0 / 1 \ 1 | 0 / 1 \ 1 | 1 / 0 \ 0 |

| Begin Sync $\Sigma_{13}$ Bottom-Strip | | | |
|---|---|---|---|
| | NRZ Symbol | | |
| | 3 | 0 (7) | 7 (3) |
| 1 / 0 \ 1 | 0 / 1 \ 1 | 0 / 1 \ 1 | 1 / 0 \ 0 |

| Begin Sync $\Sigma_{14}$ Bottom-Strip | | | |
|---|---|---|---|
| | NRZ Symbol | | |
| | 0 | 0 (7) | 3 (7) |
| 1 / 0 \ 1 | 1 / 0 \ 1 | 1 / 0 \ 1 | 0 / 1 \ 1 |

FIG.32C

| Begin Sync $\Sigma_{15}$ Bottom-Strip | |
|---|---|
| | NRZ Symbol |
| | 7     0     3<br>(7)  (7) |
| 1<br>/<br>0<br>\\<br>1 | 0    0    1<br>/    /    /<br>1    1    0<br>\\   \\   \\<br>0    0    0 |

| Begin Sync $\Sigma_{16}$ Bottom-Strip | |
|---|---|
| | NRZ Symbol |
| | 7     0     3<br>(7)  (7) |
| 1<br>/<br>0<br>\\<br>1 | 0    0    1<br>/    /    /<br>1    1    0<br>\\   \\   \\<br>0    0    0 |

FIG.32D

METHOD AND APPARATUS FOR MULTI-DIMENSIONALLY ENCODING AND DECODING

The present invention relates to a method of multi-dimensionally encoding a user data stream of user words into a channel data stream of channel words evolving in a one-dimensional direction of infinite extent. The invention relates further to a corresponding method of multi-dimensionally decoding a channel data stream, to a corresponding encoding apparatus, to a corresponding decoding apparatus, to a storage medium and a signal including such a channel data stream and a computer program for implementing said methods.

European patent application EP 01203878.2 discloses a method and system for multi-dimensionally coding and/or decoding an information to/from a lattice structure representing channel bit positions of said coded information in at least two dimensions. Encoding and/or decoding is performed by using a quasi close-packed lattice structure. For the case of three-dimensional encoding and/or decoding, preferably a (quasi) hexagonally close packed (hcp) lattice structure is to be used. Another possibility in three dimensions, is the use of a (quasi) face-centered cubic (fcc) lattice structure. For the case of two-dimensional encoding and/or decoding, preferably a quasi-hexagonal lattice structure is to be used. Another possibility in two dimensions could be the use of a quasi square lattice structure. For the sake of a more simple and clear description of the object of the present invention, special attention is given to the two-dimensional case. The higher-dimensional cases can be derived as more or less straight forward extensions of the two-dimensional case.

For the quasi-hexagonal lattice in particular, at least partial quasi-hexagonal clusters consisting of one central channel bit and a plurality of nearest neighbouring channel bits can be defined, and a code constraint can be applied such that for each of said at least partial quasi-hexagonal clusters a predetermined minimum number of said nearest neighbouring bits are of the same bit state (one or zero, indicating the bipolar bit-values that are written to the channel) as said central bit. Thereby, intersymbol interferences (ISI) can be minimized at a high code efficiency. Furthermore, another code constraint can be applied such that for each of said at least partial quasi-hexagonal clusters a predetermined minimum number of said nearest neighbouring bits are of the opposite bit state as said central bit. This constraint provides an advantageous high pass characteristic to avoid large areas of channel bits of the same type.

It is an object of the present invention to provide a method of multi-dimensionally coding and decoding which implement the coding constraints and coding geometries as defined in the above mentioned European patent application and which lead to higher storage densities and improve the coding efficiency.

This object is achieved by a method of multi-dimensionally encoding a user data stream of user words into a channel data stream of channel words evolving in a one-dimensional direction of infinite extent, as claimed in claim 1, wherein:

- a user word is encoded into an NRZ channel word by selecting said NRZ channel word from a code table depending on said user word and the current state of an underlying finite-state-machine, wherein an NRZ channel word comprises a sequence of NRZ channel symbols of NRZ channel bits having a one-dimensional interpretation along said one-dimensional direction and wherein states of an underlying finite-state-machine describing the characteristics of the multi-dimensional code are defined by NRZI channel bits of the previous channel word and by NRZ channel symbols of the current channel word,
- the NRZ channel symbols are transcoded into NRZI channel symbols by a one-dimensional 1T-precoding operation including an integration modulo 2, said 1T-precoding operation being carried out along said one-dimensional direction of infinite extent, and
- said finite-state-machine is put into a new state selected from said code table depending on said user word and the current state of said finite-state-machine together with encoding a user word into a channel word.

This object is further achieved by a method of multi-dimensionally decoding as claimed in claim 8 wherein:

- the NRZI channel symbols are transcoded into NRZ channel symbols by an operation reverse to a one-dimensional 1T-precoding operation including an integration modulo 2, said reverse operation comprising at least a differentiation operation wherein an NRZ channel word comprises a sequence of NRZ channel symbols of NRZ channel bits having a one-dimensional interpretation along said one-dimensional direction and wherein states of an underlying finite-state-machine describing the characteristics of the multi-dimensional code are defined by NRZI channel bits of the previous channel word and by NRZ channel symbols of the current channel word, and
- the NRZ channel word is decoded into a user word by selecting said user word from a code table depending on said NRZ channel word and the next-state of said underlying finite-state-machine at which the next user word in said user data stream has been encoded, wherein said next-state of a current channel word of said underlying finite-state-machine is defined by NRZI channel bits of the current channel word and by NRZ channel symbols of the next channel word.

The invention relates further to an apparatus for encoding as claimed in claim 28, to an apparatus of decoding as claimed in claim 29, to a storage as claimed in claim 30, to a signal as claimed in claim 31 and to a computer program as claimed in claim 32. Preferred embodiments of the invention are defined in the dependent claims.

The present invention relates generally to multi-dimensionally encoding and decoding in which the code evolves in a one-dimensional direction of infinite extent. In the specific case of 2D, as defined in the particular embodiments of claims 2 and 8, the method then applies to a 2D strip with the code evolving in the direction of infinite extent. In the specific case of 3D, the method applies to a 3D tube, in which two directions are of finite extent. Preferably, the 3D tube could be a straight tube along said one-dimensional direction of infinite extent. The section of the 3D tube orthogonal to said direction of infinite extent could be preferably of a square of hexagonal shape, leading to a close-packing of 3D tubes.

The present invention is based on the idea to implement the coding constraints defined in the above mentioned European patent application which leads to a reduction of the error rate due to intersymbol interference and/or large areas of the same (bipolar) bit type in a 2D coding scheme where 2D coding is performed along a strip comprising a number of rows of channel bits. According to the invention an isotropic 2D constraint is used for construction of the coding scheme using a certain convention for the channel symbols. In a 1D runlength-limited (RLL) coding scheme, the code constraint is a one-dimensional constraint that applies along the direction of infinite extent along which the code evolves. The coding scheme according to the present invention for two-dimensional (and multi-dimensional) coding is different from a 1D coding scheme, since now the constraint is two-dimensionally (or more-dimensionally) isotropic and since the channel bit stream along the strip evolves one-dimensionally in said direction of infinite extent of the strip. The characteristic problem is thus the construction of 2D codes (and in general multi-dimensional codes) with isotropic code constraints for codes that evolve in one dimension.

According to the invention a finite-state-machine (FSM) is used for the definition of a code table generated during construction of the code which are then used for encoding and decoding. Said finite-state-machine has a number of FSM-states which are defined according to the invention dependent on NRZI channel bits of a previous channel word and on NRZ channel symbols of a current channel word. The code table defines relations between user words and channel words and, in addition, between user words and the next-states to be used in said finite-state-machine, said relations being dependent on the current state on the finite-state-machine.

In this connection NRZI channel bits mean channel bits representing, for a disc, the marks and non-marks written to the disc, for instance bit value "0" meaning a non-mark or land, bit value "1" meaning a mark or pit. NRZ channel bits which have a bit value "1" are only used for a one-dimensional start of a new run where a run comprises a number of successive NRZI bits of the same type. The NRZ to NRZI transformation is typically done by a 1T-precoder which comprises an integration modulo 2.

Preferred embodiments according to which DC-control based on the running digital sum of the two-dimensionally encoded channel bit (or data) stream, along a two-dimensional strip can be performed are defined in claims 4 to 7. Preferably certain DC-control points are identified in the two-dimensional channel data stream. Preferably, at said DC-control points another separate channel code is used, called substitution code, instead of using the standard code, called main code. For DC-control a selection of a channel word out of a set of channel words is advantageously performed, which set of channel words belong to said separate substitution code which is different from the main code mainly used for encoding the user words into channel words.

According to further embodiments of the invention, as defined in claims 12 and 13 a quasi-hexagonal lattice structure is used. The benefit of such a quasi-hexagonal lattice as compared e.g. to a square lattice results from a subtle combination of coding efficiency and also the effects of the next-nearest neighbours on the inter-symbol interference. With the quasi-hexagonal lattice is meant a lattice that may be ideally hexagonally arranged, but small lattice distortions from the ideal lattice may be present. For instance, the angle between the two basic axes of the lattice may not be exactly equal to 60 degrees. The quasi-hexagonal lattice yields an arrangement of bits that is more resembling the intensity profile of the scanning laser spot used during read-out.

Alternatively, a quasi-rectangular or a quasi-square lattice can be used comprising four nearest neighbours.

The invention is preferably applied to a two-dimensional code which comprises two-dimensional strips of three rows of channel bits which shall be called "fish-bone code" in the following, which maps 11 user bits onto four successive bit-triplets each forming an 8-ary channel symbol, yielding in total 12 channel bits. Said two-dimensional three-row strips can coherently but independently be stacked upon each other using the underlying lattice which is common to the separate strips. A 2D cluster constraint is preferably applied according to which each NRZI channel bit has at least one neighbour with the same bit-value among its sixth nearest neighbours leading to a reduction in the bit error rate.

According to a further preferred embodiment a substitution code comprising substitution channel words is defined which is preferably used for control of the running digital sum, which is averaged in the direction of finite extent in the strip. In said substitution code 7 user bits are preferably mapped onto 9 substitution channel bits which are arranged along the 2D strip in three channel bit-triplets each forming an 8-ary substitution channel symbol. Consequently, the underlying finite-state-machine and the code table of said substitution code are different from the finite-state-machine and the code table of the main code.

In still a further embodiment of the invention a bulk cluster constraint and a boundary cluster constraint are defined in claim 23 which are applied to the channel data stream. Boundary is therein to be understood as the boundary between strips (for 2D), tubes (for 3D) of sequences of channel words evolving in the one-dimensional direction of infinite extent, or as the border between any multi-dimensional bodies (for multiple dimensions).

Violations of the boundary cluster constraint, preferably without violating the bulk cluster constraint at the corresponding boundaries can then advantageously used as synchronisation patterns in the channel data stream as defined in claims 24 to 27. In addition free bits within a synchronisation pattern can be used to embed different synchronisation colours.

Figure 2:
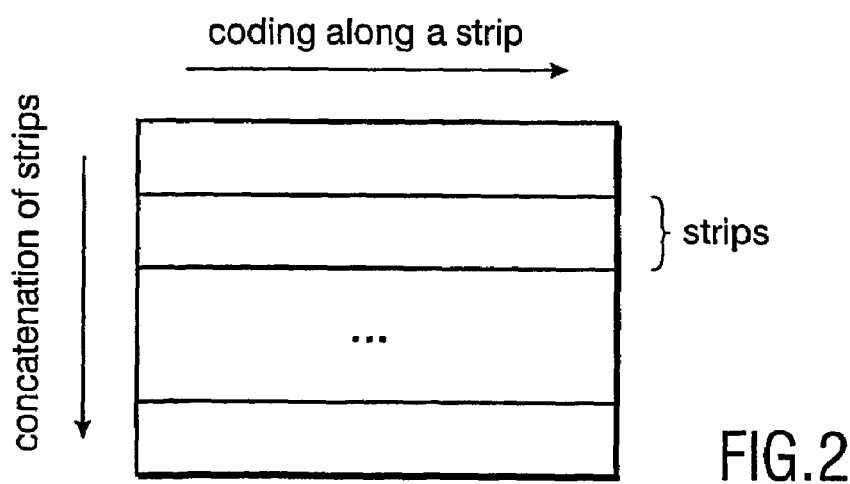
Figure 3A:
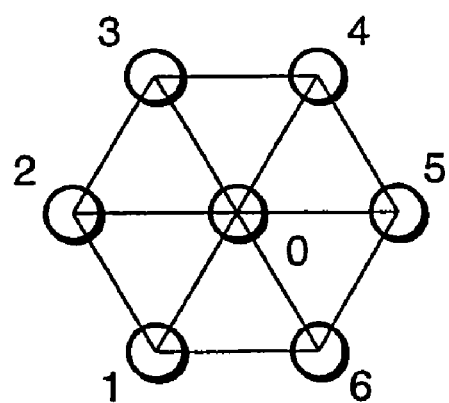
Figure 3B:
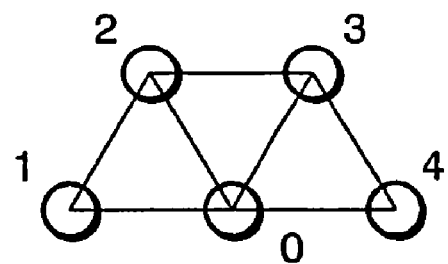
Figure 3C:
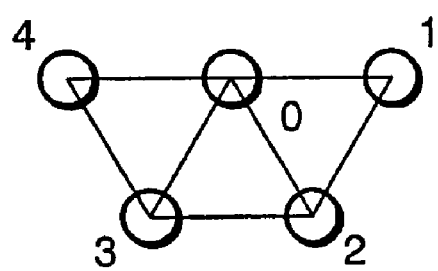
Figure 4A:
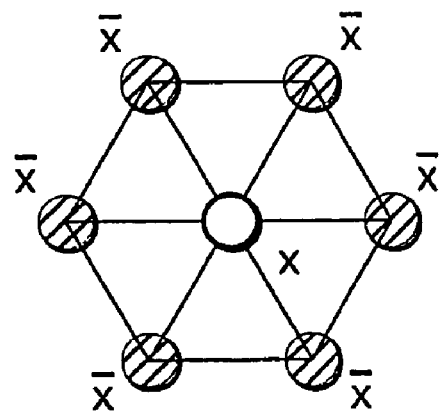
Figure 4B:
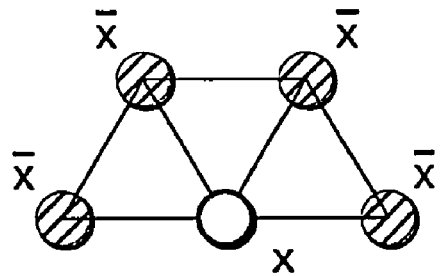
Figures 10, 11:
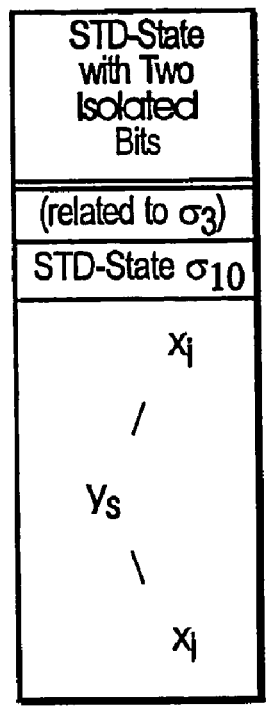
Figure 18:
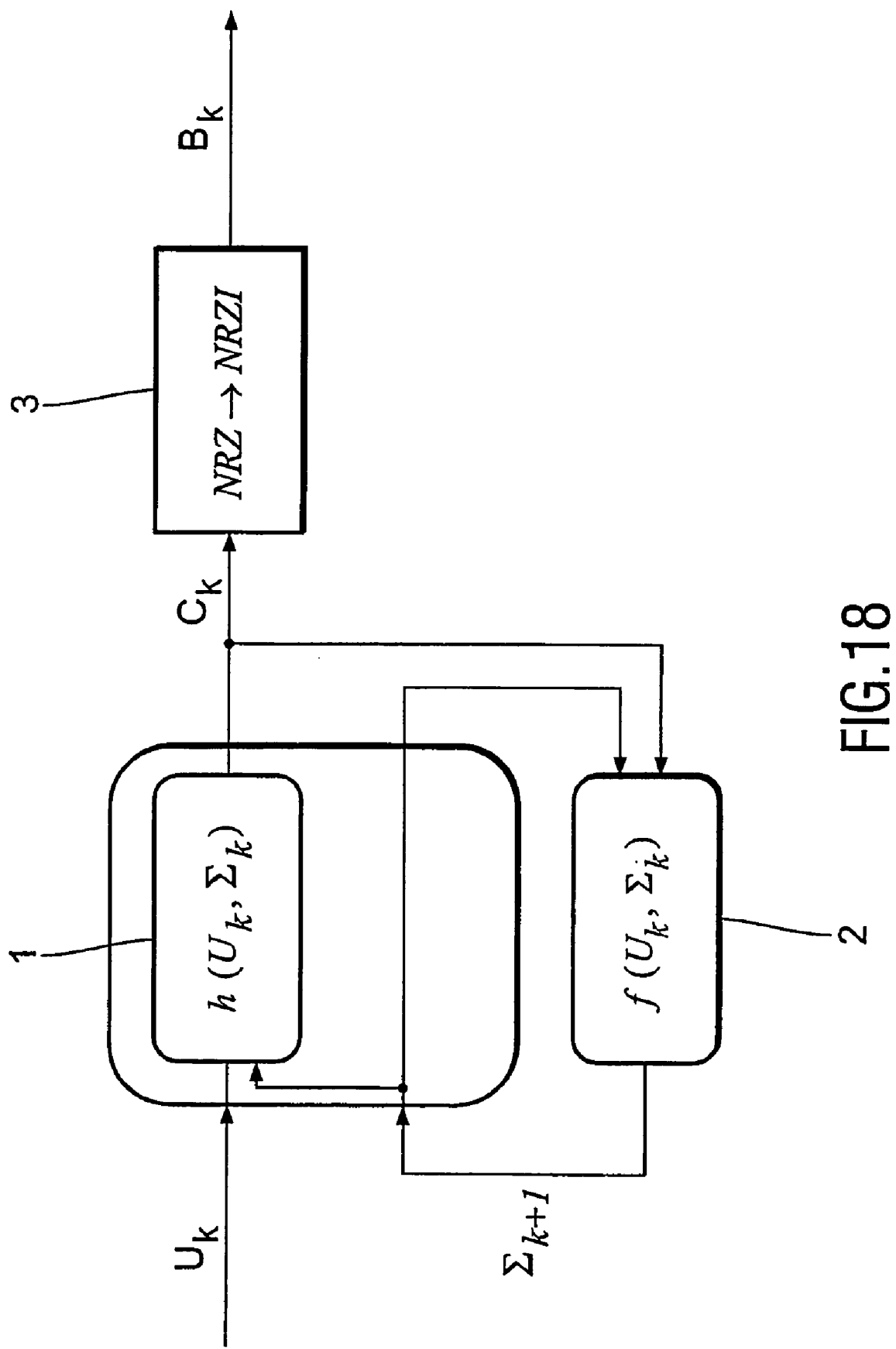
Figure 19:
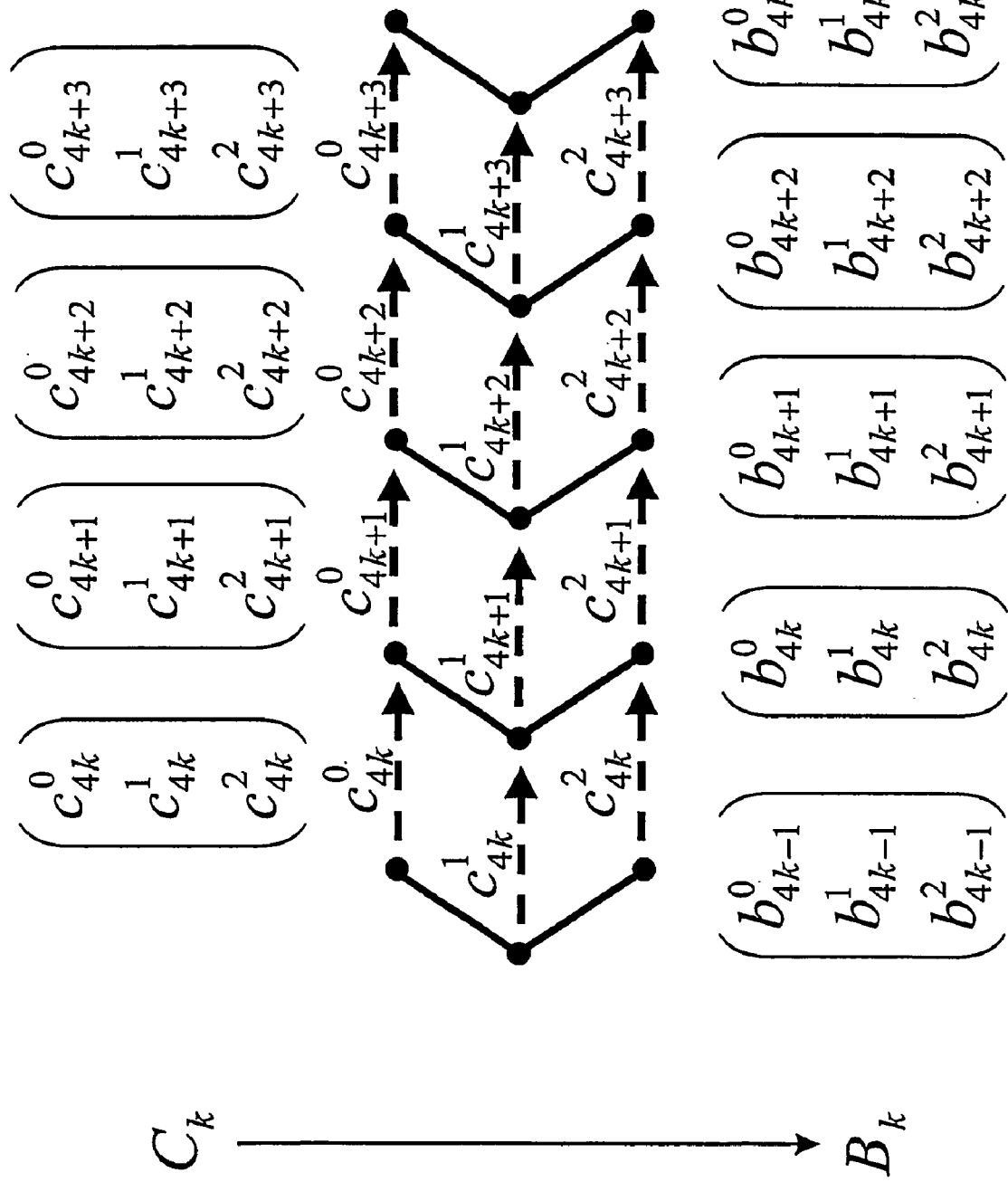
Figure 20:
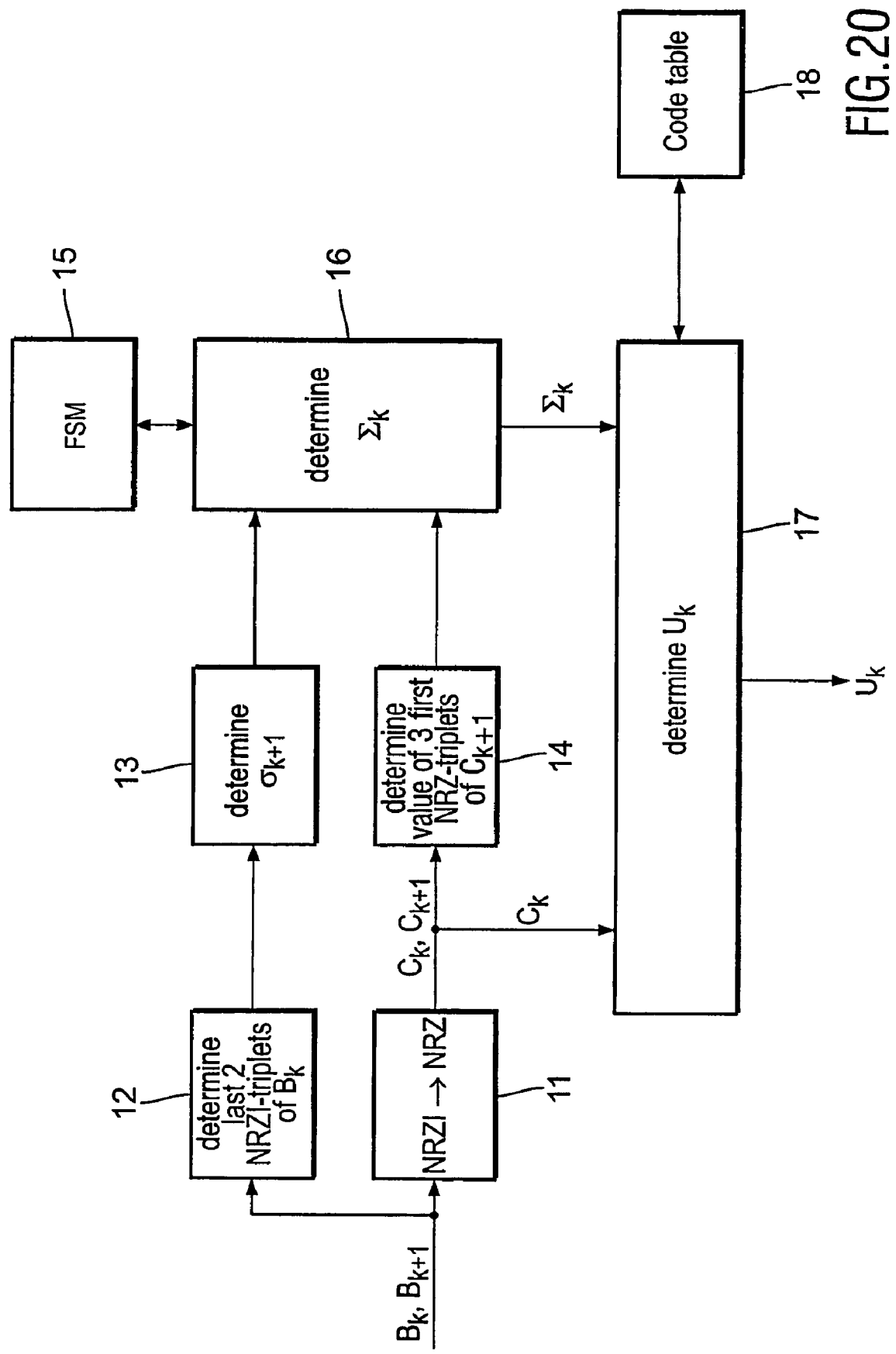
Figure 21:
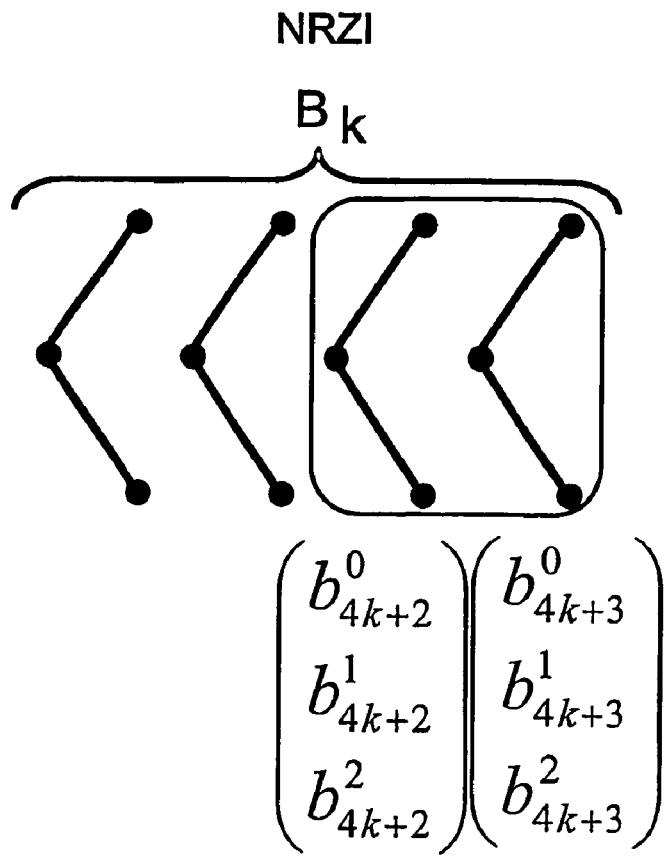
Figure 22:
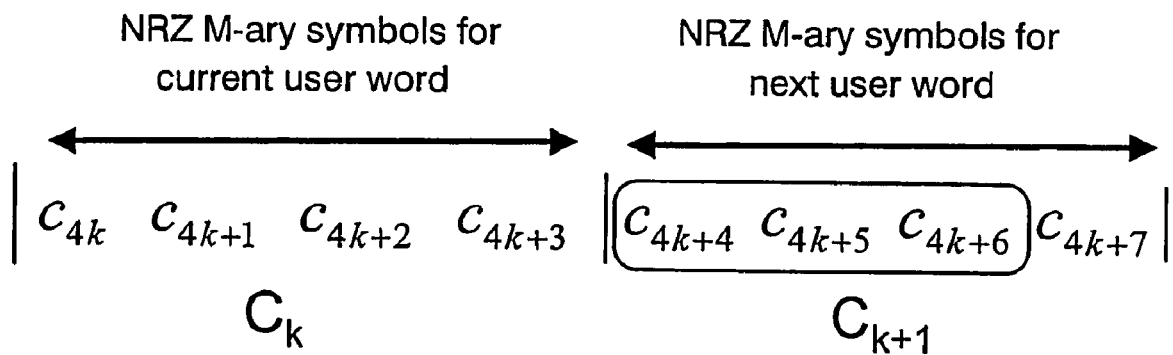
Figure 23:
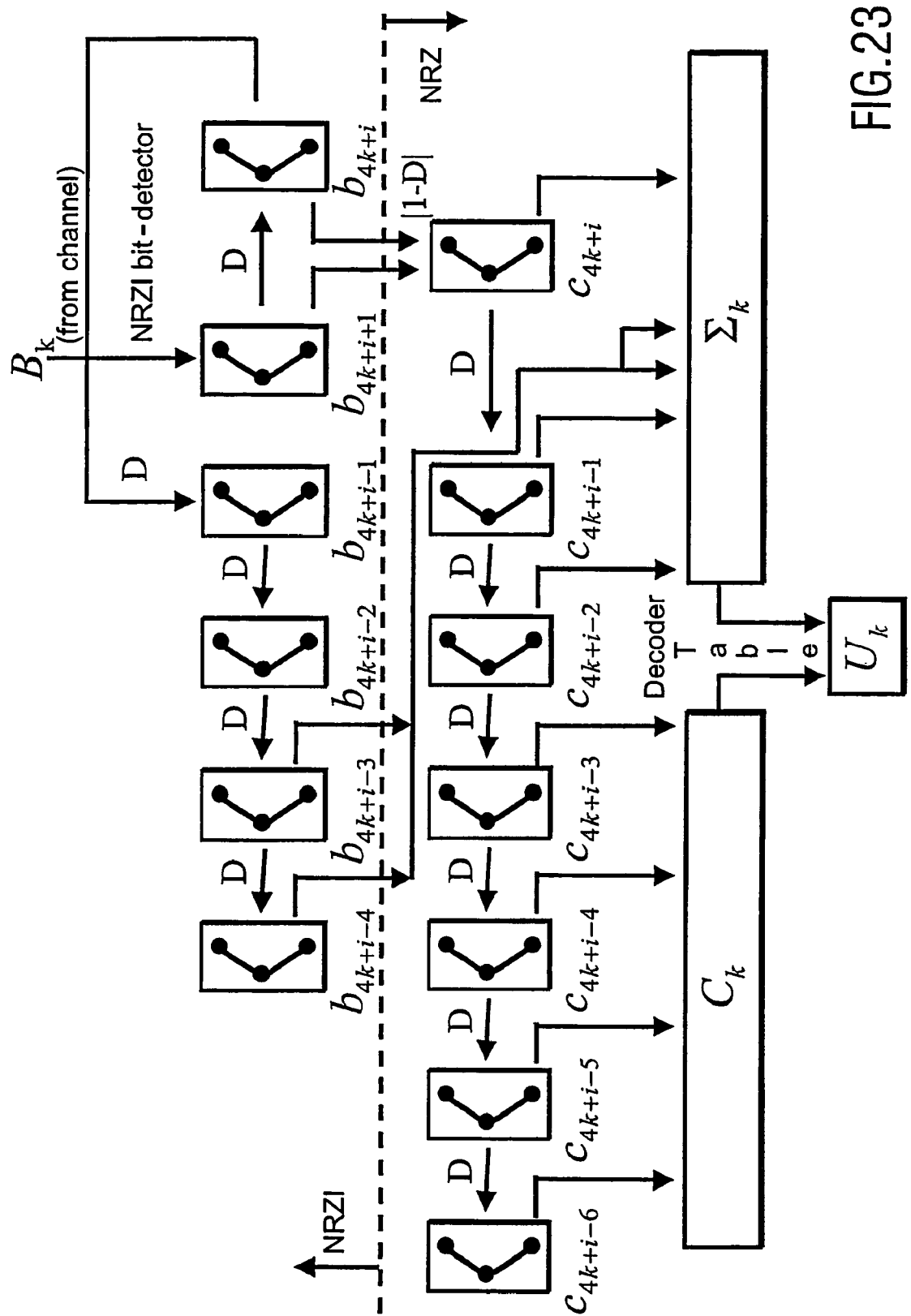

The present invention shall now be explained more in detail with reference to the drawings, in which:

FIG. 1 shows a block diagram of the general layout of a coding system,

FIG. 2 shows a schematic diagram indicating a strip-based two-dimensional coding scheme, FIGS. 3A to 3C show hexagonal bulk clusters, bottom and top boundary clusters of bit sites, FIGS. 4A, 4B show forbidden patterns of a bulk cluster and a boundary cluster, FIGS. 5A, 5B show a part of a hexagonal code along a 3-row strip and a schematic representation thereof, FIGS. 6a, 6b show a coherent stack of two strips of a fish-bone code and a schematic representation thereof, FIGS. 7A, 7B show bit-triplets of a fish-bone code illustrating isolated bits in a boundary row and a central row, respectively, FIG. 8 shows STD-states without isolated bits, FIG. 9 shows STD-states with a single isolated bit, FIG. 10 shows an STD-state with two isolated bits, FIG. 11 illustrates the interpretation of an NRZ channel symbol, FIG. 12 gives an example for the interpretation of an NRZ channel symbol, FIG. 13 shows the structure of a state-transition diagram, FIG. 14 shows the code rate and efficiency of a preferred embodiment of a 2D code, FIGS. 15A, 15B illustrate the symmetry of a state-transition diagram, FIG. 16 shows the characteristics of a 16-state finite-state-machine according to a preferred embodiment for a fish-bone main code, FIG. 17 shows part of the code table of a possible implementation for the fish-bone main code, based on the finite-state-machine shown in FIG. 16, FIG. 18 shows a block diagram of an encoder according to the present invention, FIG. 19 illustrates the transformation from NRZ channel symbols to NRZI channel symbols, FIG. 20 shows a block diagram of a decoder according to the present invention, FIG. 21 illustrates a first condition for determining a next FSM-state during decoding, FIG. 22 illustrates a second condition for determining a next FSM-state during decoding, FIG. 23 shows a more detailed block diagram of a decoder according to the present invention, FIG. 24 illustrates row-based control of the running digital sum, FIG. 25 illustrates overall running digital sum control using parity-vectors, FIG. 26 shows pairs of parity-vectors for overall DC-control, FIG. 27 shows an alternation scheme of a main code and a substitution code, FIG. 28 shows the characteristics of a 16-state fish-bone substitution code, FIG. 29 shows part of the code table of a possible implementation for a substitution code according to FIG. 28, FIG. 30 shows a characteristic synchronization pattern for a stack of two 3-row strips, FIGS. 31A to C show the first two channel symbols of the synchronization pattern in the top-strip for different FSM-states of the 11-to-12 fish-bone code, and FIGS. 32A to D show the first three channel symbols of the synchronization pattern in the bottom-strip for different FSM-states of the 11-to-12 fish-bone code.

FIG. 1 shows typical coding and signal processing elements of a data storage system. The cycle of user data from input DI to output DO can include interleaving 10, error-correction-code (ECC) and modulation encoding 20, 30, signal preprocessing 40, data storage on the recording medium 50, signal post-processing 60, binary detection 70, and decoding 80, 90 of the modulation code, and of the interleaved ECC. The ECC encoder 20 adds redundancy to the data in order to provide protection against errors from various noise sources. The ECC-encoded data are then passed on to a modulation encoder 30 which adapts the data to the channel, i.e. it manipulates the data into a form less likely to be corrupted by channel errors and more easily detected at the channel output. The modulated data are then input to a recording device, e.g. a spatial light modulator or the like, and stored in the recording medium 50. On the retrieving side, the reading device (e.g. charge-coupled device (CCD)) returns pseudo-analog data values which must be transformed back into digital data (typically one bit per pixel for binary modulation schemes). The first step in this process is a post-processing step 60, called equalization, which attempts to undo distortions created in the recording process, still in the pseudo-analog domain. Then the array of pseudo-analog values is converted to an array of binary digital data via a bit-detector 70. The array of digital data is then passed first to the modulation decoder 80, which performs the inverse operation to modulation encoding, and then to an ECC decoder 90.

In the above mentioned European patent application EP 01203878.2 the 2D constrained coding on hexagonal lattices in terms of nearest-neighbour clusters of channel bits is described. Therein, it has been focussed mainly on the constraints with their advantages in terms of more robust transmission over the channel, but not on the actual construction of such 2D codes. The latter topic is addressed in the present application, i.e. the implementation and construction of such a 2D code shall be provided. By way of example, a certain 2D hexagonal code for the constraint $N_{nn}=1$ shall be illustrated in the following. However, it should be noted that the general idea of the invention and all measures can be applied generally to any 2D hexagonal code. Moreover, the general idea can equally well be applied to the case of other 2D lattices, like the 2D square lattice. Finally, the general idea can also be applied for the construction of multi-dimensional codes, possibly with isotropic constraints, characterized by a one-dimensional evolution of the code.

As mentioned, in the following a 2D hexagonal code with a hexagonal cluster constraint given by $N_{nn}=1$ shall be considered. A hexagonal cluster consists of a bit at a central lattice site, surrounded by six nearest neighbours. The parameter $N_{nn}$ is the minimum number of nearest neighbours that needs to be of the same type as the channel bit on the central lattice site. In this way, a 2D code with a low-pass nature is realized, with reduction of the intersymbol-interference (ISI), similar to the 1D case of a runlength-limited (RLL) code with the d-constraint with reduced ISI along the one-dimensional direction in which the 1D code evolves. A realisation of the 2D code in a 2D strip is considered for the case of hexagonal lattices. A 2D strip consists of a number of 1D rows, stacked according to the stacking rules of the 2D hexagonal lattice. The principle of strip-based 2D coding is shown in FIG. 2.

At the boundaries of the 2D strip, incomplete hexagonal clusters are formed, consisting of only 5 lattice sites, i.e. one central site plus four nearest-neighbour sites, instead of the 7 lattice sites of the bulk cluster in the centre area of the strip. The structure of the clusters is shown in FIG. 3. In the bulk cluster shown in FIG. 3A, the central bit has the number i=0, while the six nearest-neighbour bits are successively numbered i=. . . 6 in the order of their azimuth. The incomplete or partial-sized boundary clusters of FIG. 3B showing a bottom boundary cluster and FIG. 3C showing a top boundary cluster at the edges of a strip consists of only 5 bits or bit sites, compared to the seven bits or bit sites for the bulk cluster. The central bit also has the number i=0, while the four azimuthally contiguous nearest-neighbour bits are successively numbered i=1 . . . 4.

Strips are constructed in such a way that coherent concatenation of strips in the vertical direction does not lead to violations of the constraints across the strip boundaries. With coherent concatenation of strips in the vertical direction, the use of the same hexagonal lattice for the different strips (comparable to epitaxial growth of crystal structures, with one crystal structure per strip) is meant. This implies that the 2D constraint of the boundary clusters must already be satisfied without knowledge of the two missing channel bits which are located at the other side across the boundary of the strip. For the constraint $N_{nn}=1$, this implies that one configuration for the bulk cluster and one configuration for the boundary clusters are forbidden.

FIG. 4A shows a forbidden bulk cluster and FIG. 4B shows a forbidden boundary cluster. The bit at the central lattice site has a value x (equal to 0 or equal to 1). All surrounding bits have the opposite value $\bar{x}$ (equal to 1 or equal to 0, respectively). These clusters do not satisfy the above mentioned low-pass constraint according to the minimum number of nearest-neighbours ($N_{nn}=1$) that must be of the same type or bit state as the bit located at the central lattice site. Regarding a more detailed explanation of the constraints and the general aspects and characteristics of hexagonal lattices reference is made to the above mentioned European patent application EP 01203878.2 which is herein incorporated by reference.

In the following, the practical case of three rows in a 2D strip shall be considered to describe the STD (State Transition Diagram) states for $N_{nn}=1$. The STD describes the basic flow of symbols for any encoder in accordance with the $N_{nn}$ constraint. The FSM of a code is derived from and based upon this STD. Generalisation to any other number of rows is more or less straightforward. The STD-states are described in terms of the three NRZI channel bits at a given horizontal position in a strip. The bit configuration is shown schematically in FIGS. 5A and 5B. It can reconsidered as a 1D stack of fish-bones, each fish-bone characterizing a bit-triplet in a vertical direction, which is the direction of finite extent of the 2D strip. The STD-states correspond to the bit-triplet along each vertically aligned fish-bone, that is, (uvw), (xyz), (abc), etc. The STD-states are characterized by the NRZI channel bits which are the bipolar channel bits having values −1 or +1 representing pit-marks and landmarks or vice versa. Alternatively, but leading to an identical description, the bit values 0 and 1 could be used instead of the bipolar bit values −1 and +1. Bit-triplets that are identical apart from an overall sign conversion for each bit, that is, (xyz) and $(\overline{xyz})$, refer to the same state. In this way, already four different states can be distinguished. The fish-bone code for one single strip is schematically shown in FIG. 5B.

As mentioned before, a broad spiral with more rows can be constructed by stacking two or more 2D strips (e.g. each of three rows) on top of each other in a coherent way (comparable to epitaxially grown structures in materials science). The hexagonal lattice is continuing over the common boundary of the two strips. In FIG. 6A, the bottom fish-bone pattern (strip 1) is shifted in the horizontal direction over a distance equal to half the distance between successive bits with respect to the top fish-bone pattern (strip 2). This is needed to preserve the underlying hexagonal lattice across the strip boundary. In this way, for example, using n strips each of three rows, a broad spiral consisting of 3n rows can be constructed. For each strip, the coding is done over three rows only in the direction of the strip. The constraint of the boundary cluster enables to stack one strip coherently on top of the other, without violation of the $N_{nn}$ constraint. By combination of strips with different number of rows, a broad spiral with any number of rows can be constructed. The situation for a stack with two strips is shown in FIG. 6A. The bits of the first strip have an index equal to 1, and the bits of the second strip have an index equal to 2. A schematic diagram of said stack of two strips of the fish-bone code is shown in FIG. 6B.

Next, an extra set of states in addition to the four already identified is introduced in order to be able to realize the 2D constraint $N_{nn}=1$. This constraint has an isotropic 2D character, which is not compatible with the 1D evolution of the coding along a strip wherein a single bit for all rows is emitted simultaneously, that is in the present practical case, a bit-triplet. For this purpose, the concept of isolated bits, denoted by xi, and surrounded bits, denoted by $x_s$, is introduced. For an isolated bit, the neighbouring bits in the current bit-triplet and the previous bit-triplet all have the opposite bit-value. In such case, at least one of the bits in the next bit-triplet which are the neighbours of the considered isolated bit, must have the same bit value as the isolated bit, in order to satisfy the $N_{nn}=1$ constraint. For a surrounded bit, at least one of the neighbouring bits in the current bit-triplet and the previous bit-triplet has the same bit value, so that the $N_{nn}=1$ constraint is already satisfied for that bit, irrespective of the value (or bit-state) of the next bit-triplet.

An example of both bit-types is shown in FIG. 7. The dots represent bits that are irrelevant for the example. First, an isolated bit in a boundary row is considered as shown in FIG. 7A, where the constraint for the boundary cluster must be satisfied. The two successive bit-triplets shown in FIG. 7A are $(\overline{x}_s, \ldots)$, $(\overline{x}_i x_s.)$. In order to satisfy the 2D constraint for bit $\overline{x}_i$, the next bit-triplet must be different from $(x_s x_s.)$.

Next, an isolated bit in the central row as shown in FIG. 7B is considered, where the constraint for the bulk cluster must be satisfied. The two successive bit-triplets shown in the example are: $(x_s x_s x_s)$, $(x_s \overline{x}_i x_s)$. In order to satisfy the 2D constraint for bit $\overline{x}_i$, the next bit-triplet must be different from $(.x_s.)$.

A next interesting observation is that the number of isolated bits in a triplet can be either 0, 1 or 2, and in the latter case, the two isolated bits can not be located at neighbouring sites. Therefore, the 5 possible triplet configurations in terms of isolated bits are: $(x_s y_s z_s)$ (no isolated bits), $(x_i y_s z_s)$, $(x_s y_i z_s)$, $(x_s y_s z_i)$ (a single isolated bit), and $(x_i y_s z_i)$ (exactly two isolated bits). The bit values for x, y and z can be either +1 or −1.

Finally, a state-transition diagram (STD) of 10 states will be obtained. The first four states $\sigma_1, \sigma_2, \sigma_3, \sigma_4$ have only bits of the surrounded bit-type in the triplets. These four states are shown in FIG. 8.

Next, there are 5 STD-states $\sigma_5, \ldots, \sigma_9$ as with one isolated bit in the triplet as shown in FIG. 9. There is one state, $\sigma_5$, related to state $\sigma_2$, in which the first bit has become of the isolated type. There are three states, $\sigma_6, \sigma_7$ and $\sigma_8$, related to state $\sigma_3$, in which respectively the first, the second and the third bit have become of the isolated type. There is again one state, $\sigma_9$, related to state $\sigma_4$, in which the third bit has become of the isolated type.

Finally, there is one state $\sigma_{10}$ with two isolated bits in the triplet as shown in FIG. 10. Said state $\sigma_{10}$ is related to state $\sigma_3$, in which the first bit and the third bit have become of the isolated type.

Next, the alphabet of channel symbols shall be explained. 2D coding along the 2D strip involves emission of a channel symbol upon transition from one state of the STD towards one of the possible next-states of the STD. The channel symbols are M-ary, with $M=2^{N_{row}}$, with $N_{row}$ the number of rows in a strip. For the practical case considered at present, $N_{row}=3$, so the there are 8 different channel symbols, denoted by [l], with $0 \leq l \leq 1$. The channel symbol [l] corresponds with a symbol triplet (ijk) where the bits i, j and k are binary (0 or 1) and with the relation $l=i+2j+4k$. The bits i, j and k are NRZ-bits, that is, each bit indicates a transition (1) or the absence of a transition (0) in the bipolar NRZI channel bit stream of the corresponding row in the strip at the current horizontal position. The transformation from NRZ bits to an NRZI goes along exactly the same lines as in the case of 1D RLL coding, where this is known as the 1T-precoder.

The interpretation of the channel symbol is schematically shown in FIG. 11. The bit-triplets $(x_1 y_1 z_1)$ and $(x_2 y_2 z_2)$ are actually defined in terms of the bipolar bits $x_j, y_j, z_j$ (with j=1,2) denoted by 0 and 1, but representing in fact "real" bipolar values equal to −1 or +1.

A practical example for the interpretation of the channel symbol is shown in FIG. 12.

Next, the structure of the state-transition diagram (STD) shall be described. The flow of channel symbols through the STD is described by the table shown in FIG. 13. Said table shows in a matrix which next STD-state corresponds with the next NRZI bit-triplet that will be transformed starting from a starting STD-state with a current NRZI bit-triplet upon emission of an NRZ channel symbol with an M-ary value (M=8) denoted by [1], with 1=0, 1, . . . , 7. As can be seen, for some starting STD-states certain NRZI channel symbols are not allowed since otherwise the 2D code constraints would be infringed.

From the table shown in FIG. 13, a connection matrix D of the STD (a 10-by-10 matrix) can be derived. The maximum eigenvalue of this matrix is 6.888204, leading to a theoretical capacity of C=0.928043 per channel bit. It should be noted that, corresponding to each 8-ary channel symbol, 3 channel bits are emitted upon one step in the STD. An actual code must therefore have a mapping of m user bits onto 3n channel bits. Some potential code-mappings for the current constraints ($N_{nn}=1$ and 3-row strip) are given in the table shown in FIG. 14. The rate of the code is given by R=m/3n and should satisfy, according to Shannon, the inequality R≦C. The code efficiency n is given by $\eta$=R/C. The codes are listed for increasing m, and only when it leads to a higher efficiency than previous entries in the table.

Inspection of the state-description of the STD immediately reveals that there are three pairs of STD-states that have a symmetry relation: the pair of states $\sigma_2$ and $\sigma_4$, the pair of states $\sigma_5$ and $\sigma_9$, and the pair of states $\sigma_6$ and $\sigma_8$. The states of each pair are transformed into one another by a mirror operation around the central row of the 3-row strip of the fish-bone code. Similarly, in the table shown in FIG. 13, this symmetry can be observed as identical fan-out of the states of each of the state-pairs, if a proper permutation of the channel symbols and a proper permutation of the next-states is carried out according to the tables shown in FIGS. 15A, 15B.

For the design of a sliding-block code with a high efficiency, that is, a code with a high rate R close to capacity C, the procedure described in "*Algorithms for Sliding Block Codes. An application of Symbolic Dynamics to Information Theory*", R. L. Adler, D. Coppersmith, M. Hassner, IEEE trans. inform. theory, vol. 29, 1983, pp. 5–22, is followed which is known as the ACH-algorithm. The ACH-algorithm was originally designed for 1D-RLL codes. The ACH-algorithm will now be applied for the design of a 2D code along a 2D strip. This is due to the fact that in a 2D code according to the invention, channel symbols are still emitted sequentially with a 1D evolution along the 2D strip in the one-dimensional direction of infinite extent. The code design via the ACH-algorithm is based on an approximate eigenvector v, the components of which have to satisfy, for a code with m-to-3n mapping, and with $D^n$ the n-th power of the connection matrix D, and with $D^n_{ij}$ the element with indices (ij) of the n-th power of D, and with 10 states in the STD:

$$\Sigma^{10}_{j=1} D^n_{ij} v_j \geq 2^m v_i.$$

In the code design use shall be made of the symmetry properties as described above. Therefore the approximate eigenvector shall be restricted to cases where:

$$v_5 = v_9 \leq v_2 = v_4$$

$$v_{10} \leq v_6 = v_8.$$

Since STD-state $\sigma_7$ has a fan-out that can not be easily shared with other STD-states, unless at an increase of the final number of states in the finite-state-machine (FSM) of the code, the additional constraint is introduced that $v_7$ should be as low as possible, preferably $v_7=0$. There are four approximate eigenvectors that satisfy these conditions (with $v_7=0$):

$$v_1 = \{4,4,2,4,3,3,0,3,3,2\}$$

$$v_2 = \{4,4,3,4,3,3,0,3,3,2\}$$

$$v_3 = \{4,4,4,4,3,3,0,3,3,1\}$$

$$v_4 = \{4,4,4,3,3,0,3,3,2\}.$$

As a particular embodiment $v_2$ has been chosen for the code construction. Vectors $v_3$ and $v_4$ lead to an additional FSM-state for STD-state $\Sigma_3$. Vectors $v_1$ and $v_2$ both lead to 16 different FSM-states, but $v_2$ is chosen because it leads to little more freedom in the code construction. The extra freedom is due to the fact that the number of surplus words on top of the required number $2^m$ with m=11 is larger for the case with $v_2$ than for $v_1$.

Next the structure of a finite-state-machine for an 11-to-12 fish-bone 2D code with $N_{nn}=1$ and $N_{row}=3$ shall be explained. The second candidate approximate eigenvector $v_2$ of the previous section, that is $v_2=\{4,4,3,4,3,3,0,3,3,2\}$ shall be used. Each channel word comprises 4 successive 8-ary NRZ channel symbols of each 3 bits, leading in total to 3×4=12 channel bits per channel word.

In order to realize a k-constraint in the direction along the strips, all words abcd where abc=000 or where bcd=000 have been eliminated. Thus, at maximum two leading and two trailing 8-ary zeros are allowed in each channel word. This automatically leads to a k=4 constraint in the direction along the strip.

A 16-state FSM is obtained the characteristics of which are described in the table shown in FIG. 16. The FSM-states are denoted by $\Sigma$, the STD-states are denoted by $\sigma$. By related STD-states, the state of the STD and the corresponding amount of state-splitting as indicated by the respective component of the approximate eigenvector is meant. For instance, state $\sigma_1$ has a component $v_1=4$, so four different FSM-states are constructed on the basis of $\sigma_1$, which are: $\Sigma_1$, $\Sigma_2$, $\Sigma_3$ and $\Sigma_4$. The table lists also the fan-out for each FSM-state, which is the number of channel words leaving that state. In order to have a code, a fan-out should always be not smaller than $2^{11}=2048$, which is the minimum fan-out needed for each FSM-state. The obtained code will be called the main code in view of a combi-code that will be introduced later for 2D coding with DC-control. Said combi-code will comprise the present main code and an additional substitution code defined later.

Although the FSM characterized by the table shown in FIG. 16 is a 16-state FSM, 5 of the 16 FSM-states have been obtained by application of the mirror operation described with reference to FIGS. 15A, 15B so that the number of effectively different states amounts to 11. It shall be noted that there is a surplus number of words for all FSM-states, which is the difference of the actual fan-out, and the minimum fan-out required, which is equal to 2048. The surplus words can be used for extra purposes like DC-control of stochastic type, or as a side-channel on top of the main data channel with 11-to-12 mapping of user data onto channel data. Such use of surplus words is common in 1D-RLL channel modulation codes like EFMPlus as used in DVD.

By way of illustration, part of the code tables of the 16-state fish-bone code, i.e. the main code, with 11-to-12 mapping is shown in FIG. 17. The 12 channel bits of a channel word are represented as 4 consecutive 8-ary NRZ symbols, corresponding to 4 consecutive fish-bones. The table shows for each user word arranged in vertical direction the corresponding NRZ channel word and the next FSM-state (NS) $\Sigma$ of the FSM depending on the current FSM-state $\Sigma$ arranged in horizontal direction of the table. It should be noted that there are two lines in the table for each user word, each line comprising the words for 8 FSM-states.

FIG. 18 shows a block diagram of an encoding apparatus according to the present invention. Said encoder is assumed to be in its current state denoted by the state $\Sigma_k$. Said encoder encodes a user word $U_k$ comprising a specified number of user bits, into an NRZ-channel word $C_k$ which is subsequently transformed into an NRZI channel word $B_k$. In addition, an underlying finite-state-machine is put into a new state $\Sigma_{k+1}$. In the particular embodiment of the main code a user word $U_k$ comprises 11 bits which is mapped onto a 12-bit NRZ channel word $C_k$ by a mapping unit 1. For said mapping besides the user word $U_k$ the current state $\Sigma_k$ of the underlying finite-state-machine is relevant as explained above with reference to FIG. 17. Said current FSM-state $\Sigma_k$ is at the same time transformed into a next FSM-state $\Sigma_{k+1}$ by a state conversion unit 2 which conversion is also dependent on the user word $U_k$ and the current FSM-state $\Sigma_k$ as will immediately be apparent from FIG. 17. The conversion of the NRZ channel word $C_k$ into an NRZI channel word $B_k$ is thereafter performed by a channel word converter 3 which is a row-wise 1T-precoder for each of the rows in the complete strip. The 1T-precoder comprises an integration modulo 2 as is used for standard 1D RLL codes.

As shown in FIG. 19 an NRZ channel word $C_k$ comprises four 8-ary channel symbols $c_{4k}$, $c_{4k+1}$, $c_{4k+2}$, $c_{4k+3}$ each comprising three NRZ channel bits. Correspondingly each NRZI channel word $B_k$ comprises four 8-ary NRZI channel symbols $b_{4k}$, $b_{4k+1}$, $b_{4k+2}$, $b_{4k+3}$ each forming a triplet of 3 NRZI channel bits of a fish-bone. As shown in FIG. 19 the NRZ channel bits determine how the NRZI bits of a current NRZI fish-bone are converted into NRZI bits of a next fish-bone. This conversion is performed row-wise according to a one-dimensional 1T precoder operation along each of the individual rows of the strip. It should be noted that the first NRZ symbol of the channel word $C_k$ converts the last NRZI bit-triplet $b_{4k-1}$ of the previous channel word $B_{k-1}$. Thus, for the first NRZ symbol of the channel word $C_k$, denoted by $c_{4k}$, NRZ channel bit $c^0{}_{4k}$ determines how NRZI channel bit $b^0{}_{4k-1}$ is converted into NRZI channel bit $b^0{}_{4k}$, NRZ channel bit $c^1{}_{4k}$ determines how NRZI channel bit $b^1{}_{4k-1}$ is converted into $b^1{}_{4k}$ and so on; for the second NRZ symbol of the channel word $C_k$, denoted by $c_{4k+1}$, NRZ channel bit $c^0{}_{4k+1}$ determines how NRZI channel bit $b^0{}_{4k}$ is converted into NRZI channel bit $b^0{}_{4k+1}$, NRZ channel bit $c^1{}_{4k+1}$ determines how NRZI channel bit $b^1{}_{4k}$ is converted into $b^1{}_{4k+1}$ and so on.

Decoding of a channel word of the fish-bone code needs:
(a) the 4 M-ary (M=8) NRZ channel symbols of the current word of interest, and
(b) the decoding of the next FSM-state which needs the NRZI bit-triplet(s) of the last channel symbol, or, at maximum, of the two last channel symbols of the current channel word in order to determine the STD state, and which further needs the NRZ M-ary channel symbols of at maximum the first three symbols of the next channel word.

A block diagram of a decoding apparatus according to the present invention is shown in FIG. 20. Therein, a channel word converter 11 is provided for converting, in a first step, received NRZI channel words $B_k$, $B_{k+1}$, . . . into NRZ channel words $C_k$, $C_{k+1}$, . . . , i.e. to perform a horizontal differentiation combined with a absolute-value operation, as a reverse operation compared to FIG. 19. Said conversion is again performed individually for each row of the strip according to a one-dimensional operation.

In order to be able to determine the user word $U_k$ encoded into the NRZI channel word $B_k$, besides the NRZ channel word $C_k$ the next FSM-state $\Sigma_{4+1}$ of the current user word, i.e. the FSM-state $\Sigma_{k+1}$ at which the next user word $U_{k+1}$ has been encoded, has to be determined. Said FSM-state $\Sigma_{k+1}$ shall be determined by unit 16 based on the characteristics of the finite-state-machine FSM underlying the code. Said characteristics, i.e. the characteristics of the table shown in FIG. 16 are stored in FSM unit 15.

In a first sub-step for determining said FSM-state $\Sigma_{k+1}$ the last two NRZI-triplets of the NRZI channel word $B_k$ are determined in block 12. Said current NRZI channel word $B_k$ is schematically shown in FIG. 21, with the NRZI channel bits of the last two bit-triplets explicitly written down. In block 12, the last two triplets $b_{4k+2}$ and $b_{4k+3}$ are thus determined. The second last triplet $b_{4k+2}$ is needed to identify potentially isolated bits in the last triplet. The knowledge of said last two triplets allows identification of the STD-state $\sigma_{k+1}$ at the beginning of the next channel word, and represents a first selection of the FSM-states. For instance, STD-state $\sigma_1$ points towards one of the FSM-states $\Sigma_1$, $\Sigma_2$, $\Sigma_3$ or $\Sigma_4$ in the code table shown in FIG. 16. Said STD-state $\sigma_{k+1}$ is thus determined in unit 13.

In a second sub-step at maximum three NRZ channel symbols from the next channel word $C_{k+1}$ are determined in block 14. This is illustrated in FIG. 22 showing the four NRZ channel symbols of the current NRZ channel word $C_k$ and the four NRZ channel symbols of the next NRZ channel word $C_{k+1}$ from which at maximum the first three NRZ channel symbols $c_{4k+4}$, $c_{4k+5}$, $c_{4k+6}$ are determined. This allows full identification of the FSM-state $\Sigma_{k+1}$ at the beginning of the next channel word using the FSM table stored in FSM storage 15 shown in FIG. 16 by state determination unit 16.

Using the knowledge of the current NRZ channel word $C_k$ and of the next FSM-state $\Sigma_{k+1}$ the user word $U_k$ can finally be determined in block 17 using the code table shown in FIG. 17 and being stored in a code table storage 18.

A more detailed block diagram of a decoding apparatus according to the present invention is shown in FIG. 23. It illustrates how the individual bit-triplets of the NRZI channel words $B_k$ and of the NRZ channel words $C_k$ are delayed by delay blocks D. And how they are used for finally determining the user word $U_k$.

Next, DC-control in a 2D channel code according to the present invention shall be explained. DC-control is needed for several reasons: (1) for retrieval of the slicer-level, (2) for avoiding low-frequency data-content interfering within the narrow bandwidth of the servo-control loops. For a strip-based 2D code, different DC-control mechanisms can be adapted. One possibility is to control the running digital sum (RDS) on each row in the strip separately. The configuration for the case with 3 rows is shown in FIG. 24. At bit position i along the horizontal direction of a strip, for row with index 1, the RDS is denoted by $RDS_i^{(1)}$. The RDS values are computed on the basis of the NRZI (bipolar) channel bits $u^{(1)}$ (with values −1, +1). The bottom index refers to the position of the channel symbol along the direction of the strip; the top index between brackets refers to the number of the row in the strip.

Another choice is to control the overall RDS of a single strip, that is, by averaging the RDS-values of all rows in a strip. The overall RDS in such a case is given by:

$$RDS_i = \sum_{l=1}^{Nrow} RDS_i^{(l)} = \sum_{l=1}^{Nrow} \sum_{j=-\infty}^{i} u_j^{(l)}.$$

DC-control in 2D coding is realized by controlling the RDS, similarly as in the case of 1D RLL coding, e.g. like in EFM, EFM Plus, EFM CC, 17 PP etc. In 1D RLL coding, the RDS is controlled by alternative choices in the NRZ channel bit stream, where the alternative choices have opposite values of the binary parity. The opposite parity will lead to a difference of exactly one (or 3, 5, . . . ) extra or one (or 3, 5, . . . ) less transition(s) in the NRZI channel bit stream: in this way, the polarity of the NRZI (bipolar) bit stream can be inverted by choosing the alternative choice for the channel word at the DC-control point in the channel bit stream, and this is the mechanism to keep the RDS within certain bounds, i.e. to keep it usually bounded as close to zero as possible.

In the case of 2D coding, an M-ary parity is used with $M=2^{N_{row}}$, since also M-ary NRZ channel symbols are used. Individual control of the RDS for each row (row-based RDS) requires at each DC-control point in the 2D bit stream the possibility to choose freely between the M possible parity values. Control of the overall RDS on the other hand requires the possibility to choose between only two parity values, $p_1$ and $p_2$, which have to satisfy the relation $p_1+p_2=M-1$. With this relation, it is realized that the two alternative choices will lead to inverted NRZI (bipolar) channel bit streams after the DC-control point.

A practical case with control on the overall RDS-value and with $N_{row}=3$ shall now be explained. With each channel word, consisting of a number of channel symbols, a parity vector p with binary components is associated. Besides the practical choice that $N_{row}=3$ the further choice is made that the channel word consists of three consecutive M-ary symbols (with M=8). The latter case will apply for the substitution code explained below. The NRZ bits of the respective symbols are denoted by $a_i^{(1)}$, with symbol positions along the strip given by i=1, 2, 3, and the rows in the strip denoted by l=1, 2, 3. The parity vector p is computed for each row as shown in FIG. 25.

For overall RDS control there are M/2 pairs of parity vectors that offer the proper alternative choices, so that the NRZI bit stream of all rows can be inverted simultaneously at a given DC-control point. For the practical case considered, there are 4 such pairs of parity vectors, as listed in FIG. 26. The modulus p, which is the M-ary parity-value, M=8, of the parity vector $p=(p^{(1)}p^{(2)}p^{(3)})$ is defined as $p=p^{(1)}+2p^{(2)}+4p^{(3)}$. The numbers of the top index denote the row in the strip.

In the following, as already mentioned above, a fish-bone combi-code for 2D DC-free coding with $N_{nn}=1$ and $N_{row}=3$ shall be explained. First, the control of the overall RDS is considered. For DC-control, it is proposed to use the concept of combi-codes as described for the 1D RLL case in "Combi-Codes for DC-Free Runlength Limited Coding", W. Coene, IEEE Trans. Cons. Electr., vol. 46, pp. 1082–1087, November 2000. For 2D coding, the main code, denoted by $C_1$, is the code with 11-to-12 mapping having four fish-bones, as described previously. It is now designed a substitution code, denoted by $C_2$, with the following properties:

the substitution code has a 7-to-9 mapping from user bits to channel bits, represented by three fish-bones;

for each 7-bit user word, there are two 9-bit channel words which have parity-vectors with complimentary parities $p_1$ and $P_2$ such that $p_1+p_2=7$, that is, the two parity-vectors belong to one of the four parity-pairs as described in the table shown in FIG. 26;

both 9-bit channel words have the same next-state in the 16-state FSM of the fish-bone code.

The last two properties guarantee full DC-control, with complete reversal of the channel bit stream in all rows of the strip, on each location in the bit stream where the substitution code is used. Moreover, look ahead DC-control can be applied for improved DC-control performance, similar as in the 1D RLL case.

The use of the 2D combi-code comprising said main code and said substitution code is shown in FIG. 27. The vertical columns indicate the different channel words used. The repetition scheme between codes $C_1$ and $C_2$ can be chosen freely, and according to the practical requirement for DC-control that is needed in the application at hand. In FIG. 27, two successive uses of the substitution code $C_2$ are separated by three successive uses of the main code $C_1$. When for instance a format choice for 2D coding has been agreed upon, said alternation scheme is fixed and known to the encoder as well as to the decoder, and is tied up to the location of synchronization patterns in the 2D channel bit stream.

The construction of the fish-bone substitution code is as follows. The same approximate eigenvector is used as was used for the design of the main code. In order to have enough fan-out ($\geq 2^7=128$) of word pairs that satisfy the conditions as described above, some slight changes have to be introduced in the characteristics of the FSM for the substitution code. The changes only apply for states $\Sigma_1$, $\Sigma_2$ and $\Sigma_3$. The corresponding structure of the FSM for the substitution code is shown in FIG. 28.

By way of illustration, part of the code-table of the 16-state fish-bone substitution code with 7-to-9 mapping is shown in FIG. 29. The 9 channel bits of an NRZ channel word are represented as 3 consecutive 8-ary NRZ channel symbols, corresponding to 3 consecutive fish-bones. The table is organized as follows: the words of the word pairs are listed on top of each other, first for FSM-states $\Sigma_1$ to $\Sigma_8$, then for FSM-states $\Sigma_9$ to $\Sigma_{16}$.

It is thus clear, that the decoding logic for the decoding of the next-state depends on whether the next user word has been encoded with the main code or with the substitution code. The decoder of the substitution code is similar to the decoder of the main code described above. The main differences are (1) that a channel word consists of only three triplets instead of the four triplets for the main code, (2) that the characteristics of the code table are different and (3) that the logics for the decoding of the next-state depend on whether the next user symbol was either an 11-bit symbol encoded with the main code or a 7-bit symbol encoded with the substitution code. The latter case is quite unlikely to occur, since in the combi-code, the use of the substitution code is (much) less frequent than the use of the main code. However, one could think for instance of another extreme situation, where only the substitution code is used.

The 11-to-12 and 7-to-9 mappings of the main code and the substitution code described above do not exactly match the size of the 8-bit symbols that are used in a byte-oriented Reed-Solomon code as used in conventional ECC. A new ECC based on 11-bit symbols can be devised without much of a problem. However, it is still possible to use a byte-oriented ECC where the 8 bits of the bytes are dispersed over possibly more than one channel word. Moreover, it is possible to disperse bytes also along the vertical direction of a broad spiral consisting of more than one 2D strip.

Next, the application of synchronization patterns for the above described fish-bone code (based upon three bit-rows in a strip) shall be explained. In a 1D RLL code synchronization patterns have a unique feature that allows to unambiguously identify these patterns in the channel bit stream of the 2D area in abroad spiral. In the case of 1D RLL coding, the unique feature is usually a violation of the runlength constraints of the RLL code. Typically, a violation of the k-constraint is used for this purpose. For instance, in DVD with EFM-Plus k=10 is used, resulting in a maximum runlength of 11T, while the unique synchronization feature is a 14T runlength. A similar idea can be applied for the 2D code, which also has a k=4 constraint for the coding of M-ary symbols in the direction along the strip. Alternatively, for the 2D code, specific bit-patterns at the boundary areas of the strips, related to the $N_{nn}$ constraint, can be used for the purpose of synchronization.

In the following, the situation shall be considered that at least two strips are coherently stacked upon each other in the vertical direction. For simplicity's sake the case with two strips shall be illustrated further. In such case, it is possible to have a violation of the boundary constraint of one strip, which does not lead to a violation of the 2D constraint ($N_{nn}$ =1) across the boundary between the strips, because the 2D constraint is satisfied by the bit of the neighbouring strip. One such characteristic pattern across the boundary of two neighbouring strips is already sufficient in order to have a typical synchronization pattern.

In the following, the case of two such characteristic features in a single synchronization pattern will be dealt with. The situation is shown schematically in FIG. 30. The synchronization patterns consist of 6 consecutive fish-bones in each of the two strips. The don't-care bits (which are not relevant for the characteristic feature or 2D bit-pattern that makes the synchronization patterns unique) are indicated by simple dots. The last NRZI bit-triplets, just before the synchronization pattern begins, are indicated as ($p_1 q_1 r_1$) and ($p_2 q_2 r_2$), for the first and second strip, respectively.

The characteristic feature of the synchronization pattern according to the present invention for the fish-bone code is the occurrence of two 2T marks under respective inclinations with the horizontal direction of the strip at angles of 60° and 120°, indicated by S1 and S2. Those patterns S1, S2 are forbidden by the boundary constraint when applied for each strip individually, but are allowed for the bulk constraint which applies when both strips are viewed as a single broad strips with twice the number of rows of the constituting strips. The occurrence of two such patterns at different angles is chosen to make the synchronization patterns more robust against channel distortions, like asymmetric spot-shapes as in the regime of disc tilt.

Next, extra requirements of the synchronization patterns shall be illustrated. For simplicity's sake, the description is again limited to the case of two 3-row strips. Some extra properties are required in relation to the synchronization patterns.

The beginning of a synchronization word must allow proper decoding of the previous channel word just before the start of the synchronization. Decoding of the channel word also needs a look-ahead into the first NRZ M-ary symbol or symbols of the next channel word. This implies that distinct synchronization patterns for each state of the FSM of the fish-bone code have to be distinguished. Further, the generation of the inclined 2T marks in the boundary area of the two strips that constitute the synchronization has to be enabled. The two NRZI channel bits (of each 2T mark) on opposite sites of the boundary need to have the same polarity. For the top-strip, this polarity is not controlled.

The realization of the proper bit-value for the bit of the 2T mark in the bottom-strip is accomplished by an additional NRZ channel symbol having value 0 or 7 located as the second fish-bone in the sequence of 6 fish-bones that constitute the synchronization pattern. A first approach is the following: the additional channel symbol flips the entire NRZI bit stream (at value 7), or keeps it all the same (at value 0). For the generation of the proper polarity for the bit-value of the bit of the 2T mark in the bottom strip, it is not needed to reverse the polarity of all three rows. It is sufficient to flip the two top rows of the bottom strip. This implies that for the NRZ symbol of the second fish-bone of the bottom synchronization pattern, we can have the values 0 and 4 on the one hand, and 7 and 3 on the other hand. The NRZI bit-value in the bottom row is then left as a free bit, which can be used for the colouring of synchronization patterns as will be described later on.

The first two channel symbols of the synchronization pattern in the top-strip are essential for the next-state decoding and the realization of the beginning of the special synchronization feature in the NRZI bit stream of the synchronization. The two essential symbols of the top-strip are shown in FIGS. 31A, B, C for each of the 16 states of the FSM in terms of NRZI bits and NRZ channel symbols. The left column shows the last NRZI bit-triplet of the code before the synchronization pattern begins while the right column shows the first two NRZI bit-triplets of the synchronization pattern. The top row shows the corresponding NRZ symbol for the first two synchronization bit-triplets.

It should be noted that, in order to limit the number of tables to be shown here, only one polarity is shown for each FSM-state: in the shown tables, the top-left NRZI-bit has always the NRZI-value of 1. It should be noted further that it is chosen here that the two top NRZI bits of the last bit-triplet shown, i.e. the second symbol or fish-bone of the synchronization in the top-strip, are identical; however, in the most general case, the very top bit may be different from its lower neighbour.

The first three channel symbols of the synchronization pattern in the bottom-strip are essential for the next-state decoding and the realization of the beginning of the special synchronization feature, i.e. the two inclined 2T marks crossing the borders of the strips, in the NRZI bit stream of the synchronization. The three essential symbols of the bottom-strip are shown in FIGS. 32A, B, C and D for each of the 16 states of the ESM in terms of NRZI bits and NRZ channel symbols. Again, the left column shows the last bit-triplet of the code before the synchronization pattern begins and the right column shows the first three channel symbols of the synchronization pattern. The top row shows the corresponding NRZ symbols.

It should be noted that only one polarity is again shown for each FSM-state: in the tables shown here, the top-left NRZI bit has always the NRZI value of 1. The second NRZ symbol of the bottom-strip synchronization pattern enables the selection of the proper polarity of the NRZI bits in the third bit-triplet of this synchronization pattern. Further, it is shown here only the case for the value 0 in the second NRZ symbol (the other value 7 is shown in brackets). For the second NRZ symbol, instead of NRZ symbol 0, also symbol 4 could have been used; similarly, instead of NRZ symbol 7, also symbol 3 could have been used. It should also be noted that it has been chosen here that the two bottom NRZI bits of the last bit-triplet shown, i.e. the third symbol or fish-bone of the synchronization pattern in the bottom-strip, are identical. In the most general case, the very bottom bit may be different from its upper neighbour. In case these bits are different, the NRZ symbol between brackets applies for the third symbol of the synchronization pattern in the bottom-strip.

Next, it shall be explained how different synchronization colours can be implemented according to the present invention. In a recording format, an ECC cluster consists of a number of recording frames, with each recording frame preceded by a synchronization pattern. For identification of the different frames, different synchronization colours are used, typically eight colours like in the DVD format. For the synchronization patterns of this stack of two strips of the 2D fish-bone code, use is made of the "free" NRZI channel bits to generate different synchronization colours. With a "free" bit, those bits are referred to that do not play a role in the next-state identification at the beginning of a synchronization pattern, nor do they play a role in the two top bits of the second fish-bone of the bottom synchronization pattern for the polarity reversal needed for the top two rows of the bottom synchronization pattern. Note that the "free" bits are not 100% free, in the sense that they must still comply to the $N_{nn}=1$ constraints for bulk and boundary clusters. There are 6 "free" channel bits in the top-strip: 5 bits in the top-right part of the top row of the synchronization pattern, and an extra bit in the middle row, at the third last position. In the bottom-strip, there are 5 bits "free" in the bottom-right part of the bottom row of the synchronization pattern.

For 8 synchronization colours, both in this bottom-strip and in the top-strip of the stack of two strips, the 5 most right NRZI bits of the bottom row or top row, respectively, are sufficient. This can be simply seen as follows. The first bit is treated as a merging bit, with a function to avoid constraint violations with the surrounding channel bits. Then, the 4 next bits can be considered to be 1D RLL encoded with a d=1 constraint. Use of the 1D RLL d=1 constraint in the top boundary row for the top strip, and the bottom boundary row for the bottom strip, automatically leads to satisfaction of the $N_{nn}=1$ constraint in these rows, irrespective of the neighbouring rows. Their 1D NRZ representation yields exactly 8 possible values, being:

SY0: 0000
SY1: 1000
SY2: 0100
SY3: 0010
SY4: 0001
SY5: 1010
SY6: 0101
SY7: 1001.

The state with which 2D encoding with a fish-bone code has to proceed in the channel bit stream after the synchronization pattern is determined at the end of the synchronization pattern, depending on the STD-state in its last triplet. The possible situations that might occur at the end of each strip of the synchronization pattern for a two-strip stack are:

$\sigma_1 \rightarrow \Sigma_1$
$\sigma_2, \sigma_5 \rightarrow \Sigma_5$
$\sigma_4, \sigma_9 \rightarrow \Sigma_9$ For the case of a 6-row broad spiral, consisting of two 3-row strips on top of each other, it is thus possible to make 8 synchronization patterns in the top and bottom part separately, leading to a total of 64 possible patterns which is quite large compared to the usual number of synchronization colours.

The application area of a code according to the present invention are preferably next-generations of optical recording such as (1) the application for 2D optical storage using a broad spiral with many rows of channel bits, being read out by means of an array of laser spots, hereby leading to high data-rate and high capacity, (2) holographic optical recording, (3) fluorescent optical recording or (4) page-oriented optical recording.

The invention claimed is:

1. A method of multi-dimensionally encoding a user data stream of user words into a channel data stream of channel words evolving in a one-dimensional direction of infinite extent, wherein;

a user word is encoded into an NRZ channel word by selecting said NRZ channel word from a code table depending on said user word and the current state of an underlying finite-state-machine, wherein an NRZ channel word comprises a sequence of NRZ channel symbols of NRZ channel bits having a one-dimensional interpretation along said one-dimensional direction and wherein states of an underlying finite-state-machine describing the characteristics of the multi-dimensional code are defined by NRZI channel bits of the previous channel word and by NRZ channel symbols of the current channel word, the NRZ channel symbols are transcoded into NRZI channel symbols by a one-dimensional 1T-precoding operation including an integration modulo 2, said 1T-precoding operation being carried out along said one-dimensional direction of infinite extent, and said finite-state-machine is put into a new state selected from said code table depending on said user word and the current state of said finite-state-machine together with encoding a user word into a channel word.

2. A method according to claim 1, wherein said method is used for two-dimensionally encoding a user data stream of user words into a channel data stream of channel words along a strip of infinite extent in a first direction of a two-dimensional lattice of channel bits and of finite extent in a second direction orthogonal to said first direction, said strip comprising a number of rows of channel bits with the rows aligned along said first direction, wherein each NRZ channel symbol comprises exactly one NRZ channel bit for each row in the strip, the NRZ channel bits having a one-dimensional interpretation for each individual row along the direction of the row in said strip, and wherein the NRZ channel symbols are transcoded into NRZI channel symbols by a row-wise one-dimensional 1T-precoding operation comprising an integration modulo 2, along each of said individual rows of said strip.

3. A method according to claim 2, wherein the NRZ channel symbols are transcoded into NRZI channel symbols by means of a one-dimensional 1T-precoder such that the NRZI channel bits inside the strip satisfy coding constraints that have two-dimensional characteristics.

4. A method according to claim 2, wherein the running digital sum of at least one row in said strip is controlled separately from the running digital sum of other rows in said strip.

5. A method according to claim 2, wherein the overall running digital sum of all rows of said strip is controlled, in particular by averaging the running digital sums calculated for each row in said strip separately.

6. A method according to claim 4, wherein the averaged running digital sum of said strip is controlled for generating a desired spectral behaviour for the strip as a whole, or wherein a number of the running digital sums for a number of rows in the strip are controlled for generating a desired spectral behaviour defined for each of the rows in the strip of said number independently.

7. A method according to claim 2, wherein the running digital sum is controlled at predetermined control points in the channel data stream and wherein said control is accomplished by selection of a particular substitution channel word out of a set of substitution channel words.

8. A method according to claim 2, wherein the individual NRZ channel bits of a channel word have a one-dimensional interpretation along the direction of a row in said strip such that bit value one represents the presence of a transition in the binary waveform along said row in said strip and that bit value zero represents the absence of a transition in the binary waveform along said row in said strip.

9. A method according to claim 2, wherein the NRZI channel bits are arranged on the lattice points of a quasi-hexagonal lattice consisting of lattice clusters each consisting of one central bit and six nearest neighbouring bits.

10. A method according to claim 9, wherein a first code constraint is applied on each of said lattice clusters such that for each of said lattice clusters a predetermined minimum number, in particular at least one, of said nearest neighbouring NRZI bits are of the same NRZI bit state as said central NRZI bit.

11. A method according to claim 2, wherein the NRZI channel bits are arranged on the lattice points of a quasi-square lattice.

12. A method according to claim 2, wherein the NRZI channel bits are arranged on the lattice points of a quasi-rectangular lattice.

13. A method according to claim 2, wherein said channel data stream comprises three rows of channel bits along a two-dimensional strip and wherein 11 user bits are encoded into 12 channel bits arranged along said strip in four channel bit-triplets each forming an 8-ary channel symbol.

14. A method according to claim 2, wherein said channel data stream comprises five rows of channel bits along a two-dimensional strip and wherein 14 user bits are encoded into 15 channel bits arranged along said strip in three channel bit 5-tuples each forming a 32-ary channel symbol.

15. A method according to claim 1, wherein said finite-state-machine (FSM) is defined based on the different possible STD-states an NRZI channel symbol can take, whereby the STD-states cover both overall polarities of the NRZI channel symbol as a whole, said finite-state-machine being able to take different FSM-states which are defined dependent on one or more related STD-states of one or more of the last NRZI channel symbols of a previous channel word and the value of the NRZ bits and symbols of the current channel word.

16. A method according to claim 13, wherein a next-state of said finite-state-machine is defined dependent on one or more related STD-states of at maximum two of the last NRZI channel symbols of a current channel word and the value of the NRZ bits of at maximum three channel symbols of the next channel word.

17. A method according to claim 1, wherein channel words not used for control of the running digital sum constitute code tables of a main code and a complete table of pairs of substitution channel words, one pair of channel words for each user word, used for control of the running digital sum constitute a substitution code being different from said main code, wherein for each user word a set of at least two substitution channel words including a parity vector having complementary parities is provided in a substitution code table and wherein to each of said at least two substitution channel words the same next-state of a finite-state-machine for said substitution code is assigned.

18. A method according to claim 17, wherein 7 user bits are encoded into 9 substitution-word channel bits of a substitution channel word arranged along said strip in three channel bit-triplets each forming an 8-ary substitution channel symbol.

19. A method according to claim 18, wherein the underlying finite-state-machine of said substitution channel code is different from the underlying finite-state-machine of said main channel code, in particular are the FSM-states defined dependent on different values of the NRZ channel symbols of the next channel word.

20. A method according to claim 1, wherein
bulk clusters are defined comprising a central bit and a number of nearest neighbouring bits,
boundary clusters are defined comprising a boundary bit and a number of nearest neighbouring bits,
a bulk cluster constraint is applied to said bulk clusters defining the minimum number of said nearest neighbouring bits having the same bit state as the central bit of the respective bulk cluster, and
a boundary cluster constraint is applied to said boundary clusters defining the minimum number of said nearest neighbouring bits having the same bit state as the central bit of the respective boundary cluster.

21. A method according to claim 20, wherein synchronisation patterns are embedded in the channel data stream by introducing violations of said boundary cluster constraint such that said bulk cluster constraint across a boundary is not violated.

22. A method according to claim 2, wherein said synchronisation pattern comprises at least one 2T mark across a boundary between two strips, in particular two 2T marks under different inclinations with the direction of infinite extent of said strips.

23. A method according to claim 22, wherein said synchronisation pattern comprises six consecutive channel symbols in each strip.

24. A method according to claim 23, wherein free channel bits of a synchronisation pattern are used to characterize the synchronisation patterns of different channel data frames by different synchronisation colours by setting a number of said free channel bits to predetermined values.

25. Storage medium storing data in form of code words encoded according to a method of claim 1, wherein a user data stream of user words is multi-dimensionally encoded into a channel data stream of channel words evolving in a one-dimensional direction of infinite extent.

26. A method of multi-dimensionally decoding a channel data stream of channel words into which user words of a user data stream are encoded, said channel data stream evolving in a one-dimensional direction of infinite extent, wherein:
the NRZI channel symbols are transcoded into NRZ channel symbols by an operation reverse to a one-dimensional 1T-precoding operation including an integration modulo 2, said reverse operation comprising at least a differentiation operation, wherein an NRZ channel word comprises a sequence of NRZ channel symbols of NRZ channel bits having a one-dimensional interpretation along said one-dimensional direction and wherein states of an underlying finite-state-machine describing the characteristics of the multi-dimensional code are defined by NRZ channel bits of the previous channel word and by NRZ channel symbols of the current channel word, and the NRZ channel word is decoded into a user word by selecting said user word from a code table depending on said NRZ channel word and the next-state of said underlying finite-state-machine at which the next user word in said user data stream has been encoded, wherein said next-state of a current channel word of said underlying finite-state-machine is defined by NRZI channel bits of the current channel word and by NRZ channel symbols of the next channel word.

27. A method according to claim 26, wherein said method is used for two-dimensionally decoding a channel data stream of channel words into which user words of a user data stream are encoded along a strip of infinite extent in a first direction of a two-dimensional lattice of channel bits and of finite extent in a second direction orthogonal to said first direction, said strip comprising a number of rows of channel bits with the rows aligned along said first direction, wherein the NRZI channel symbols are transcoded into NRZ channel symbols by a row-wise operation reverse to said one-dimensional 1T-precoding operation which includes said integration modulo 2, said reverse operation comprising at least a differentiation operation, said row-wise operation being carried out along each of said individual rows of said strip, and
wherein each NRZ channel symbol comprises exactly one NRZ channel bit for each row in the strip, the NRZ channel bits having a one-dimensional interpretation for each individual row along the direction of the row in said strip.

28. A method according to claim 27, wherein said next-state of said finite-state-machine is obtained by determining the STD-state of one Or more of the last NRZI channel symbols of the current channel word and by determining the value of a number of the NRZ channel symbols comprising exactly one NRZ bit for each row in the strip, obtained from the next channel word.

29. Apparatus for multi-dimensionally encoding a user data stream of user words into a channel data stream of channel words evolving in a one-dimensional direction of infinite extent, wherein:
a mapping unit for encoding a user word into an NRZ channel word by selecting said NRZ channel word from a code table depending on said user word and the current state of an underlying finite-state-machine, wherein an NRZ channel word comprises a sequence of NRZ channel symbols of NRZ channel bits having a one-dimensional interpretation along said one-dimensional direction and wherein states of an underlying finite-state-machine describing the characteristics of the multi-dimensional code are defined by NRZI channel bits of the previous channel word and by NRZ channel symbols of the current channel word,
a channel word conversion unit for transcoding the NRZ channel symbols into NRZI channel symbols by a one-dimensional 1T-precoding operation including an integration modulo 2, said 1T-precoding operation being carried out along said one-dimensional direction of infinite extent, and
a state conversion unit for putting said finite-state-machine into a new state selected from said code table depending on said user word and the current state of said finite-state-machine together with encoding a user word into a channel word.

30. Apparatus for multi-dimensionally decoding a channel data stream of channel words into which user words of a user data stream are encoded, said channel data stream evolving in a one-dimensional direction of infinite extent, wherein:
a channel word conversion unit for transcoding the NRZI channel symbols into NRZ channel symbols by an operation reverse to a one-dimensional 1T-precoding operation including an integration modulo 2, said reverse operation comprising at least a differentiation operation, wherein an NRZ channel word comprises a sequence of NRZ channel symbols of NRZ channel bits having a one-dimensional interpretation along said one-dimensional direction and wherein states of an underlying finite-state-machine describing the characteristics of the multi-dimensional code are defined by NRZI channel bits of the previous channel word and by NRZ channel symbols of the current channel word, and
a mapping unit for decoding the NRZ channel word is decoded into a user word by selecting said user word from a code table depending on said NRZ channel word and the next-state of said underlying finite-state-machine at which the next user word in said user data stream has been encoded, wherein said next-state of a current channel word of said underlying finite-state-machine is defined by NRZI channel bits of the current channel word and by NRZ channel symbols of the next channel word.

* * * * *